United States Patent
Rolle et al.

(10) Patent No.: US 10,552,642 B2
(45) Date of Patent: Feb. 4, 2020

(54) DYNAMIC DATA-USE RESTRICTIONS

(71) Applicant: SAP SE, Walldorf (DE)

(72) Inventors: Benny Rolle, Karlsruhe (DE); Martin Johns, Karlsruhe (DE)

(73) Assignee: SAP SE, Walldorf (DE)

( * ) Notice: Subject to any disclaimer, the term of this patent is extended or adjusted under 35 U.S.C. 154(b) by 129 days.

(21) Appl. No.: 15/650,064

(22) Filed: Jul. 14, 2017

(65) Prior Publication Data

US 2019/0018985 A1 Jan. 17, 2019

(51) Int. Cl.
| | |
|---|---|
| *G06F 21/71* | (2013.01) |
| *G06F 16/14* | (2019.01) |
| *G06F 21/62* | (2013.01) |
| *H04L 29/06* | (2006.01) |
| *H04M 3/38* | (2006.01) |
| *H04L 29/08* | (2006.01) |

(52) U.S. Cl.
CPC .............. *G06F 21/71* (2013.01); *G06F 16/14* (2019.01); *G06F 21/6209* (2013.01); *H04L 29/06* (2013.01); *H04L 67/1097* (2013.01); *H04M 3/38* (2013.01)

(58) Field of Classification Search
CPC ......... G06F 21/71; G06F 16/14; H04L 29/06; H04M 3/38
See application file for complete search history.

(56) References Cited

U.S. PATENT DOCUMENTS

| | | | |
|---|---|---|---|
| 9,916,471 B2* | 3/2018 | Branson | G06F 21/6227 |
| 2013/0318056 A1 | 11/2013 | Lekies et al. | |
| 2014/0041023 A1 | 2/2014 | Lekies et al. | |
| 2014/0101446 A1 | 4/2014 | Lekies et al. | |
| 2014/0101447 A1 | 4/2014 | Lekies et al. | |
| 2015/0007251 A1 | 1/2015 | Johns | |
| 2015/0047051 A1 | 2/2015 | Johns et al. | |
| 2016/0028742 A1 | 1/2016 | Johns et al. | |
| 2016/0028743 A1 | 1/2016 | Johns et al. | |
| 2016/0132808 A1* | 5/2016 | To | G06Q 10/06315 705/7.25 |
| 2016/0314301 A1 | 10/2016 | Johns et al. | |
| 2016/0314303 A1 | 10/2016 | Johns et al. | |

OTHER PUBLICATIONS

Heurix et al (Pseudonymization with Metadata Encryption for Privacy-Preserving Searchable Documents, 2012 IEEE, pp. 3011-3020) (Year: 2012).*

(Continued)

*Primary Examiner* — Oleg Korsak
(74) *Attorney, Agent, or Firm* — Klarquist Sparkman, LLP

(57) ABSTRACT

Data use restrictions are linked with a data value for a data instance, such as in a data type implementation. The data use restrictions can be compared with a purpose associated with an operation request, such as an operation request from a software application, to determine whether the operation is permitted or prohibited. The data use restrictions can be automatically propagated to derivative data. Log entries can be generated for operations involving the data. The data use restrictions can include a data subject identifier and a data identifier, which may be used to locate related data and data associated with a particular data subject.

20 Claims, 12 Drawing Sheets

(56) References Cited

OTHER PUBLICATIONS

"Das Standard-Datenschutzmodell—Eine Methode zur Datenschutzberatung und—prüfung auf der Basis einheitlicher Gewährleistungsziele," AK Technik der Konferenz der unabhängigen Datenschutzbehörden des Bundes und der Länder, 52 pages, 2016.
Bizer, et al., "Sieben Goldene Regeln des Datenschutzes," *Datenschutz und Datensicherheit*, 31(5): 350-356, 2007.
Bizer, Johann. Datenschutz als Gestaltungsaufgabe. Datenschutz und Datensicherheit, 31(10):725-730, 2007.
Enck, et al., "TaintDroid: An Information-Flow Tracking Aystem for Realtime Privacy Monitoring on Smartphones," *ACM Transactions on Computer Systems(TOCS)*, 32(2): 5:1-5:29, 2014.
Hansen, et al., "Protection Goals for Privacy Engineering," *IEEE Security and Privacy Workshops*, pp. 159-166, 2015.
Hoepman, Jaap-Henk, "Privacy Design Strategies (extended abstract)," *In IFIP International Information Security Conference*, pp. 446-459, 2014.
Karjoth, et al., "Platform for Enterprise Privacy Practices: Privacy-enabled Management of Customer Data," pp. 69-84. Springer, Berlin, Heidelberg, 2003.
Klieber, et al., "Android Taint Flow Analysis for App Sets," In *Proceedings of the 3rd ACM SIGPLAN International Workshop on the State of the Art in Java Program Analysis*, pp. 1-6. ACM, 2014.
Lekies, et al., "25 million flows later—Large-scale Detection of DOM-based XSS," *In Proceedings of the 2013 ACM SIGSAC conference on Computer & communications security*, pp. 1193-1204. ACM, 2013.
Ni, et al., "Privacy-Aware Role-Based Access Control," *ACM Transactions on Information and System Security*, 13(3):24:1-24:31, 2010.
Richter, Philipp, "Datenschutz durch Technik und die Grundverordnung der EU-Kommission," *Datenschutz und Datensicherheit*, 36(8): 576-580, 2012.
Schwartz, et al., "All You Ever Wanted to Know about Dynamic Taint Analysis and Forward Symbolic Execution (but Might Have Been Afraid to Ask)," *In IEEE Symposium on Security and Privacy*, 15 pages, 2010.
Tran, et al., "Tracking the Trackers: Fast and Scalable Dynamic Analysis of Web Content for Privacy Violations," *In Applied Cryptography and Network Security*, pp. 418-435, 2012.
Van Blarkom, et al., "Handbook of Privacy and Privacy-Enhancing Technologies," *College bescherming persoonsgegevens*, The Hague, 2003.
Von Maltitz, et al., "Privacy Assessment of Software Architectures based on Static Taint Analysis," arXiv preprint arXiv:1608.04671, 30 pages, 2016.
Xiao, et al., "User-aware privacy control via extended static-information-flow analysis," *Autom. Softw. Eng.*, 22: 333-366, 2015.
Zhu, et al., "Privacy Scope: A Precise Information Flow Tracking System for Finding Application Leaks," 16 pages. 2009.
Zhu, et al., "TaintEraser: Protecting Sensitive Data Leaks Using Application-Level Taint Tracking," *ACM SIGOPS Operating Systems Review*, 45(1): 142-154, 2011.

\* cited by examiner

FIG. 7

```
Class string {
        public:
                string ();                              764
                string (string& source);                766
                bool setStringValue(char*);
770 ──┬─    bool getStringValue(char*);
772 ──┬─    bool addRestrictionValue(restrictionValue);
        └─    bool removeRestrictionValue(int);
             bool addPersonID(int, int);
             bool removePersonID(int, int);
             bool getPersonID(int, vector<int>);
             bool setDataID(int, int);
             int getDataID(int, vector<int>);       708
774 ──┤     bool setType(int, protectionClass);
             protectionClass getType(int);
             bool addAllowedPurpose(int, purposeType);
             bool addBlockedPurpose(int, purposeType);
             protectionClass getType(int);
             bool removeAllowedPurpose(int, purposeType);
             bool removeBlockedPurpose(int, purposeType);
             bool checkPurpose(int, purposeType);
776 ──┬─    bool getPurpose(int, vector<purposeType>;
        └─    void showPurpose();             778
             char* anonymizeInformation();
780 ──┬─    char* exportData();
        └─    void viewLog();
             string operator+ (string& source);
             string operator= (string& source);    782
        768  void operator << ();
        └─    ~string();
        private:                              712
        704  char* stringValue;                   716
             vector<restrictionMetadata> restrictionValues;
}
```

700

720

```
Class restrictionMetadata {
        public:                               756
                restrictionMetadata();          760
        752   ~restrictionMetadata();
             void writeLog(int applicationID, actionType action, timeValue actionTime, int modifiedByID);
                                              728
             vector<int> personID;
             vector<int> dataID;           732
             eventType myEvent;              740
724  736   protectionClass protectionStatus;   744
             vector<purposeType> allowedPurposes;
             vector<purposeType> blockedPurposes;
             vector<char*> logEntries        748
                                        750
}
```

DYNAMIC DATA-USE RESTRICTIONS

FIELD

The present disclosure generally relates to analyzing software programs for compliance with data use policies or restrictions. Particular implementations relate to analyzing restriction annotations that are dynamically associated with data to determine whether particular uses of the data are permitted or prohibited.

BACKGROUND

Society is becoming ever more data driven. Companies are able to track their operations at increasing levels of granularity. For individuals, as more and more of their activity takes place, or is tracked, in the digital world, their personal information is often recorded, used, shared, and sold. Even discounting nefarious activities such as hacking, phishing, malware, and viruses, a tremendous amount of information regarding individuals can be gathered through sources such as the websites an individual visits, their actions on the websites, and activity on social networks. Sensitive information, such as personal data, can be stored by companies, such as banks, medical providers, and employers.

Individuals and governments are increasingly concerned about the collection and use of personal information. Various laws and regulations have been passed to try and specify what information about an individual can be collected, how it can be collected, and how it can be processed, shared, or transferred. While such laws can be beneficial for individuals, it can be difficult for companies, and particularly the individuals working at companies, to be aware of all the various laws and regulations that might apply to their activities. Even if a company or employee is aware of a law or regulation, laws and regulations can be difficult to understand, and their ramifications may not be clear without additional context. Thus, even when companies and employees wish to comply with relevant laws and regulations regarding the use of personal information, it can be difficult to accomplish in practice.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for automatically enforcing data use restrictions, including, in at least some aspects, dynamically propagating use restrictions to derivative data. According to a particular method, a data type instance is received. The data type instance includes at least one value data member and at least one restriction metadata data member. A request is received for an operation using the instance. The request is associated with at least a first use identifier. The at least a first use identifier is compared with a second use identifier associated with the restriction metadata data member. Based on the comparing, the operation is executed or the request is denied.

According to another method, data is received that includes a data value and one or more restriction annotations. The one or more restriction annotations include at least one use restriction. A request is received to create derivative data from the data value. A purpose associated with the request is compared with the at least one use restriction. It is determined that the purpose is consistent, or compatible, with the at least one use restriction. The derivative data is created. The at least one use restriction is automatically associated with the derivative data.

In a further method, a plurality of data instances are received. The plurality of data instances are associated with at least a first data subject identifier, at least a first data identifier, and at least one use restriction. A request is received for data instances associated with the first data identifier or the first data subject identifier. The plurality of data instances are returned in response to the request.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 7 illustrates example data types, such as class definitions, for a custom string data type and a restriction annotation data type useable with the custom string data type.

DETAILED DESCRIPTION

Example 1—Overview

Figure 1:
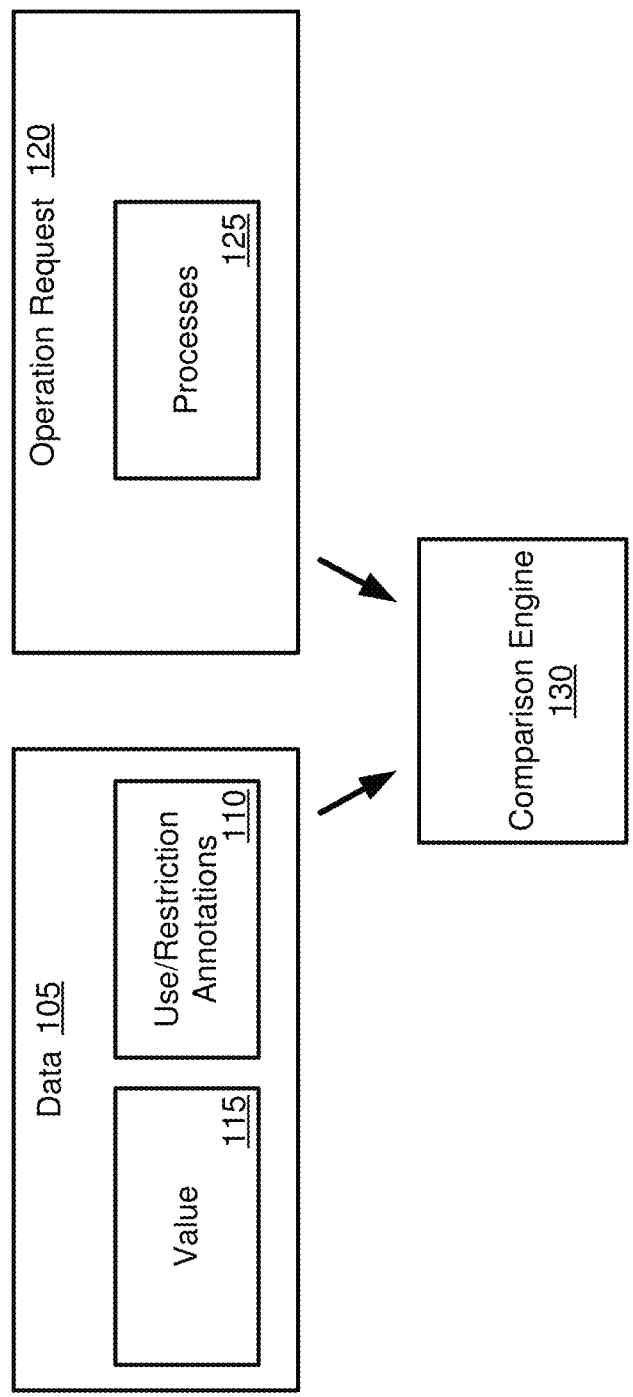
FIG. 1 is a schematic diagram illustrating a comparison engine that can operate on data instances having a data value and use, or restriction, annotations and an operation request associated with one or more uses.

Society is becoming ever more data driven. Companies are able to track their operations at increasing levels of granularity. For individuals, as more and more of their activity takes place, or is tracked, in the digital world, their personal information is often recorded, used, shared, and sold. Even discounting nefarious activities such as hacking, phishing, malware, and viruses, a tremendous amount of information regarding individuals can be gathered through sources such as the websites an individual visits, their actions on the websites, and activity on social networks. Sensitive information, such as personal data, can be stored by companies, such as banks, medical providers, and employers.

Individuals and governments are increasingly concerned about the collection and use of personal information. Various laws and regulations have been passed to try and specify what information about an individual can be collected, how it can be collected, and how it can be processed, shared, or transferred. While such laws can be beneficial for individuals, it can be difficult for companies, and particularly the individuals working at companies, to be aware of all the various laws and regulations that might apply to their activities. Even if a company or employee is aware of a law or regulation, laws and regulations can be difficult to understand, and their ramifications may not be clear without additional context. Thus, even when companies and employees wish to comply with relevant laws and regulations regarding the use of personal information, it can be difficult to accomplish in practice.

In particular cases, a software developer or programmer may create or modify a software application or program that accesses data that may be subject to legal restrictions or requirements. For example, the program may access health or financial information that is protected by one or more laws or regulations. Although the innovations of the present disclosure are generally described with respect to personal data that may be subject to governmentally-imposed legal requirements, the innovations can be used with other types of legally protected or regulated information, such as information subject to a non-disclosure agreement. The innovations can also be used with information that is the subject of some other type of monitoring or scrutiny, such as classified or confidential information of a company.

In some cases, such as when a developer has been working in a particular field for a significant period of time, and the software program under development is tailored to that specific field, a developer may be aware of at least some of the legal or other restrictions surrounding information that may be accessed, processed, or disseminated using the program. However, as laws and regulations are added and evolve, it can be difficult even for legal experts to be fully aware of all the rules that might apply to a particular action. In the case of less experienced developers, or software programs that are not tied to a specific use, the chance of noncompliance further increases.

Given budgets, deadlines, and staffing issues, is may be impracticable for suitably trained individuals, such as a legal expert, to review every software program in sufficient detail before it is released. A legal violation or other noncompliance may not be discovered until the software program is in use. At that point, the company responsible for the software program, and potentially its users, may be subject to liability or other consequences. For example, even if a company is not sued or otherwise subjected to legal proceedings for noncompliance, it can create public relations problems for the company, potentially costing the company customers, revenue, and investment. Elaborate manual processes and expensive dedicated software measures can be introduced to try and alleviate these problems, but such measures can be costly, cumbersome, unable to accommodate new or changed scenarios, and applicable to only a narrow set of circumstances.

The present disclosure provides innovations to automatically determine whether a proposed operation with the respect to data complies with use restrictions for the data. With reference to FIG. 1, the present disclosure provides for annotating data 105 with annotations 110, such that software programs can automatically determine whether a particular operation request 120 may use a value 115 associated with the data.

The operation request 120 can include, without limitation, one or more of storing, outputting (including displaying or transferring to another computing device), and manipulating data. The annotations 110 can be restriction metadata that acts as a restriction watermark that is embedded (including dynamically) with the annotated data 105, such that the annotations are propagated (including dynamically) with any transfer of all or a portion of the value 115. That is, disclosed innovations can function to provide taint-tracking, which can preserve a link between the data value 115 and the annotations 110, including when the data is processed (including the creation of derivative data) or communicated.

In at least some cases, the propagation of annotations 110 occurs without requiring specific application logic. For instance, suitable functionality can be implemented in a program library or a programming language, including in definitions of data types and operations for their manipulation. Thus, the disclosed innovations can provide a framework that can be transparently be used by applications. This framework can be broadly applicable, including to applications that were not specifically, or originally, designed for tracking or enforcing data use restrictions (e.g., the data types and libraries used by the application implement the data tracking and use restrictions).

In a particular embodiment, the data 105 can be annotated with one or more of a data subject identifier (which can indicate the data's provenance-to whom does the data belong, or to whom does it apply) and a use or purpose identifier (which can indicate restrictions that apply when processing or communicating the data). The data subject identifier may be used to associate the data value 115 with a particular data subject, such as a particular individual (or, in some cases, a plurality of individuals, including individuals having a common characteristic, such as belonging to a particular family or to a common organization). In a particular example, the data subject can be associated with particular actions that are permitted for data associated with that data subject. As an example, a particular individual may have consented to their data being stored and used by an organization for a particular purpose, say for the purpose of obtaining medical treatment, but may not have consented to having their data used for other purposes, such as general research purposes or for marketing purposes.

In other cases, the data value 115 can be associated with a data subject identifier and a use identifier, where the use identifier identifies (directly, or in some cases indirectly, such as by reference to a policy) one or more permitted or prohibited uses or actions. Such an implementation may be particularly useful when a data subject, such as an individual, has data that may be subject to different restrictions. For example, an individual may have financial data that may be used for certain purposes and medical data that may be used for different purposes. In some implementations, a single policy for a single data subject may not provide sufficient flexibility for processing data of different types. In other cases, the data can have a type, and a data policy for a data subject can specify different permitted or prohibited purposes, or other properties, for different data types.

The disclosed innovations can assist in providing desired features for protecting data of a data subject that may be subject to use restrictions, including legally imposed use restrictions. For instance, the disclosed innovations can help provide that data is only used for particular purposes, such as purposes for which a data subject has provided permission or consent. This can be implemented by associating a particular operation request 120 with one or more processes 125 (e.g., particular purposes for which the data is used, for example, copying might be associated with both email marketing and fulfilling a customer order). A comparison engine 130 can determine whether the processes 125 are permitted to execute the operation request 120 given the annotations 110 of the data 105 (e.g., a process that is specified as being permitted or prohibited in the annotations 110). If a process 125 of the operation request 120 is permitted (e.g., fulfilling an order), the operation can be executed. If a process 125 of the operation request 120 is not permitted (e.g., email marketing), the operation is not executed and/or an exception is generated (e.g., an error message or log entry is generated). By restricting access, such as for uses having a purpose matching a purpose or policy associated with the data, the disclosed innovations can help guard against unauthorized access to, as well as loss or alteration of, restricted data.

As data needed for particular purposes can be more easily identified, the disclosed innovations can help ensure that accessed data is limited to data actually needed for a particular purpose. As data can be associated with an individual, the disclosed innovations can help ensure that data associated with the individual is accurate and up to date.

In at least some implementations, data can be associated with an event that can trigger an action, such as deletion of the data 105 (or, at least the value 110), or provide that further operations are not permitted for the data (including operations associated with particular purposes or policies). In one aspect, the event can be a date, such that a rule triggers the action a certain time after the data 105 was obtained, or a date after which the data will expire. Or, the event can be related to an allowed purpose for the data (e.g., determining if a customer is eligible to open an account, or completion of order processing). This can help ensure that data is not used or maintained for longer than needed to accomplish a particular purpose, such as a purpose for which an individual has provided consent.

The disclosed innovations can allow organizations to demonstrate that they have adequate safeguards in place to comply with data privacy laws or other legal obligations (including regulatory obligations or contractual obligations). In addition to demonstrating compliance to legal authorities, the disclosed innovations can allow an organization to inform a data subject, such as an individual, about how their information is being processed, provide the data subject the opportunity to obtain the information that is being maintained about them (including in a machine-readable format), update or correct any inaccuracies in the data, remove consent for a particular use, request that their data be deleted, or combinations thereof.

Example 2—Example Use Checking with Custom Data Type

Figure 2:
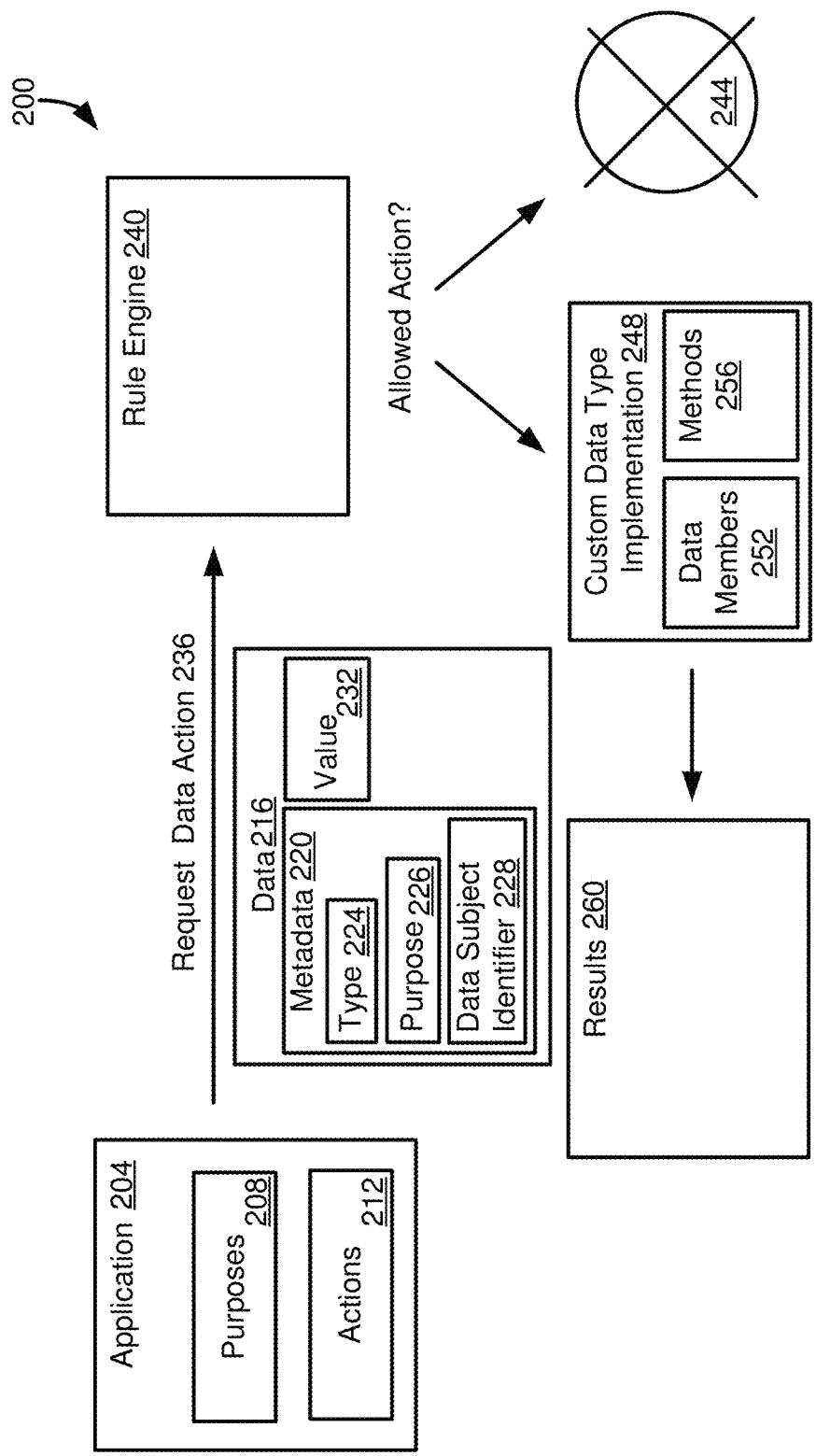
FIG. 2 is a schematic diagram illustrating how a custom data type implementation and a rule engine can be used to determine whether an action regarding a data instance is permitted based on one or more purposes associated with an application providing the request and a purpose associated with the data instance.

FIG. 2 illustrates an example scenario 200 using innovations according to the present disclosure. The scenario 200 includes an application 204, such as a software application. The application 204 can be associated with one or more purposes 208 and one or more actions 212 that the application may take with respect to data 216. Actions 212 may include, for example reading data 216, creating data, modifying data, transmitting data, displaying data, exporting data, storing data, and deleting data. Modifying data 216 can include modifying the data itself, or aggregating or extracting all or a portion of the data. The actions 212 may include other types of actions.

The data 216 can be associated with metadata 220, which may serve as restriction annotations. The metadata 220 can include a type 224, one or more purposes 226, and a data subject identifier 228. The type 224 can be, in a particular example, an indicator that the data 216 is useable to identify a data subject (e.g., a particular individual), or that the data is factual data (or otherwise is not useable to identify a data subject). In another case, the type 224 can be another indicator for a sensitivity of the data instance 216 (e.g., "high," "medium," "low," "highly-sensitive," "unrestricted," "confidential," etc.), which can be used, such as by an application, to determine how to process the data instance. In further cases, the type 224 can be used to classify data as directly associated with a data subject (e.g., "fact" or "identity"), and other metadata 220 can be associated with a sensitivity level (e.g., "confidential," "restricted," "unrestricted").

In a specific example, the type 224 can indicate that the data instance 216 is highly sensitive (using a suitable value), and can be used by an application to exclude the data from log files generated during application execution (as opposed to log files generated by an implementation framework for the data 216). For instance, when a user enters information, an associated application may normally log that activity, in addition to logging that occurs as part of the instantiating of a data type instance associated with the information. Or, an application may log database or network operations. In some cases, a subsequent use (which can be a direct use) of the data (e.g., order fulfillment) can be allowed, while an ancillary use (e.g., logging by the application, such as for error detection or security purposes, or access by system administrators for software or computer system maintenance or management purposes) may be prohibited by the metadata 220 that is assigned to the data instance 216. In further aspects, in addition to, or instead of, restricting certain operations based on the type 224, prohibited actions, including ancillary actions such as logging or access by system administrators, can be prohibited purposes 226 (or not included in a list of explicitly allowed purposes). However, when included, the type 224 can be helpful in controlling certain uses of the data instance 216 without having to explicitly specify every particular allowed or disallowed purpose 226.

The one or more purposes 226 can be, depending on the implementation, an allowed purpose (e.g., the application 204 can be allowed to perform an action 212 if a purpose 208 matches, or is consistent with, a purpose 226 of the data 216), a prohibited purpose (e.g., the application can be allowed to perform an action if the purpose 208 does not match, or is inconsistent with, a purpose 226 of the data), or a combination thereof. Data 216 may be associated with other types of metadata 220. For example, the data 216 can be associated with metadata 220 that indicates allowed or prohibited applications, or users, events that might trigger actions (including the occurrence of an event associated with a purpose 226 or an action based on a date), including combinations thereof.

The data 216 also includes a value 232, which can be a defined value or a binding to a value (e.g., associated with a particular field of a particular database record). The value 232 can be associated with a data type, which can be a primitive data type (e.g., an integer, float, or character, including arrays thereof), a composite data type (including structs), or an abstract data type.

As will be further discussed, according to at least certain disclosed innovations, the data type of the value 232 can be associated with a custom data type implementation 248 that is configured to provide and process the metadata 220, in addition to handling operations with the value 232. Accordingly, software implementing at least certain disclosed innovations can include an abstract data type that generally corresponds to a primitive data type, but includes the metadata 220 and operations associated with the metadata. The software implementing such innovations can optionally include both a standard implementation of a data type (including primitive, composite, or abstract data types) and a custom implementation associated with innovations according to the present disclosure. This can be useful when data is to be transferred or exported without the metadata 220.

In the scenario 200, the application 204 can request a data action at 236. A rule engine 240 can determine whether the requested action is permitted based on the metadata 220 of the data 216. If the rule engine 240 determines that the requested action 212 is not permitted according to the rule (which can be determined based on the purposes 208, 226), the action can be blocked at 244. Optionally, an error message can be provided to the requesting application 204, including to a user thereof. If the rule engine 240 determines that the requested action 212 is permitted, the requested action can be implemented by the custom data type implementation 248 (of which the data 216 can be an instance).

The custom data type implementation 248 can include data members 252 associated with instances of the data type, such as the data 216. The data members 252 can include both the metadata 220 and the value 232. The custom data type implementation 248 can also include methods 256, which can implement operations to manipulate the data members 252.

For instance, the methods 256 can ensure that metadata 220 is maintained along with the value 232 of the data 216, including when the data 216 is split or combined with other data, thus providing dynamic use restrictions, in the form of the metadata, that are automatically propagated with all or a portion of the value 232. The methods 256 can be called by the rule engine 240 (including at least partially implementing the rule engine), including in determining whether a requested action 212 is permitted. In some aspects, the methods 256 can be used to obtain the metadata 220 for use in determining whether the action 212 requested at 236 is permitted according to a purpose 208 associated with the application 204 and a purpose 226 associated with the metadata 220.

The custom data type implementation 248 provides results 260. Results 260 can be an action, such as transmitting, storing, or displaying data, or data that results from manipulating the data 216. Data obtained from carrying out the requested action 236 can be derived, or derivative, data. Derived data can have the same data type as the data 216, or can have a different data type. In at least some cases, the derived data type includes metadata 220, and metadata associated with the data 216 is included in the metadata of the derived data.

Example 3—Example Data Type with Restriction Metadata

Figure 3:
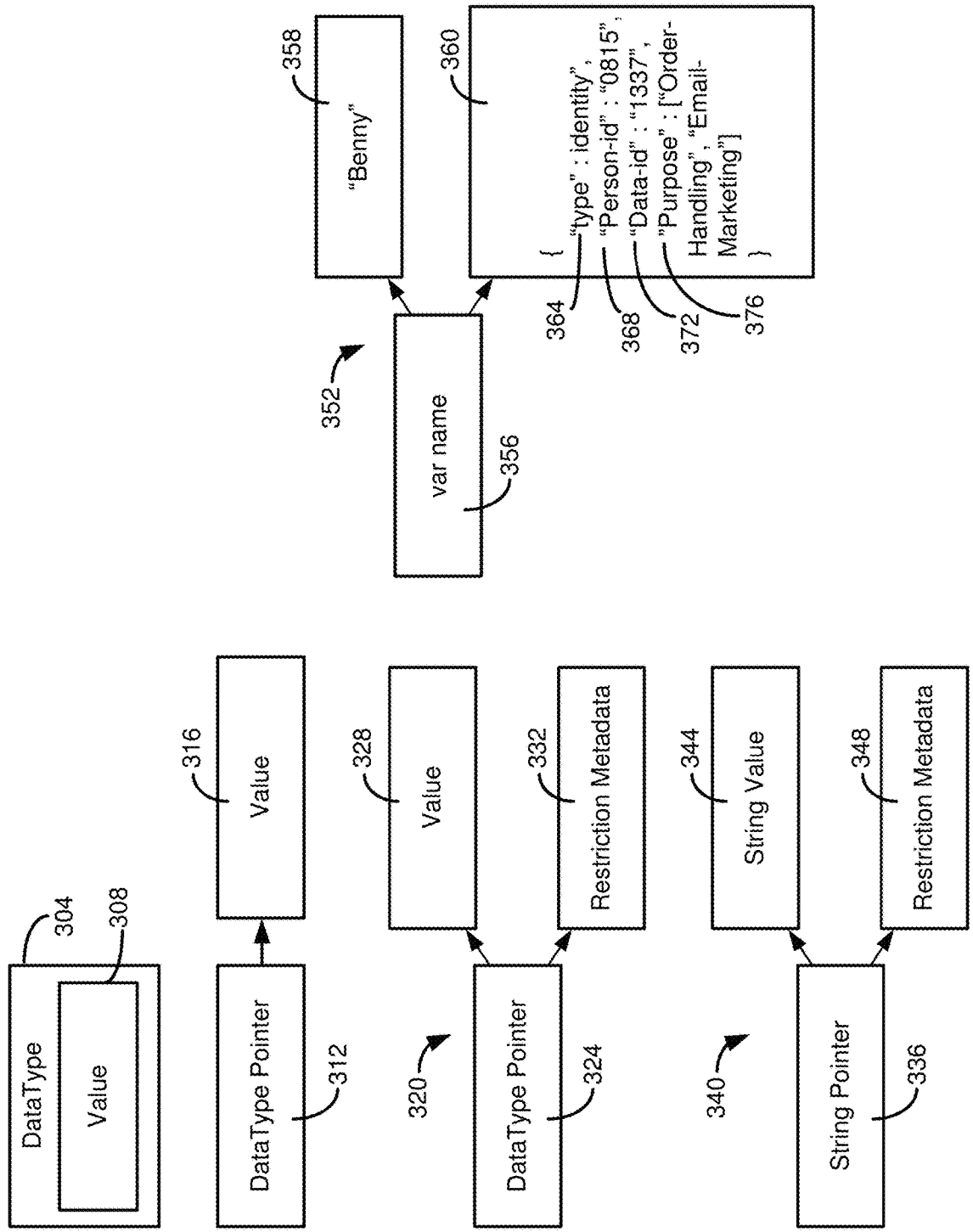
FIG. 3 is a diagram schematically depicting standard data types and custom data types that include restriction annotations in the form of restriction metadata.

FIG. 3 schematically presents an example of how restriction annotations can be implemented. A standard value-model data type (which can be a primitive data type, a composite data type, or an abstract data type) can be implemented as an instance 304 having a value 308, or as a pointer 312 to a value 316 associated with one or more instances of the data type.

According to a particular implementation of a disclosed innovation, a custom data type 320 can be implemented as a pointer 324 to a value 328 and to restriction metadata 332. That is, the value 328 and the restriction metadata 332 can be obtained by dereferencing the pointer 324.

For instance, a pointer 336 to an instance of a custom string class 340 can include a string value 344 and restriction metadata 348. In particular implementations, a custom class can support operations associated with the standard class (e.g. having the value 328, such as the value 308, but not the restriction metadata 332), and can provide standard handling for values 328, but can also include operations to handle restriction metadata. In other cases, a custom data type 320 need not correspond to another data type.

FIG. 3 illustrates a particular instance 352 of the custom string class 340. The variable "name" 356 is declared (implicitly implemented via pointers, (or references) such as in the JAVA programming language) and associated with the string value 358 of "Benny" and metadata 360. Metadata 360, corresponding to restriction metadata 348, can include one or more properties.

As shown, metadata 360 includes a type 364. In this case, the value of "identity" is assigned to type 364, indicating that this information is useable to identify a data subject, such as an individual. Another possible value for type 364 can be "fact," or another value indicating that the string value 344 is not useable to identify a data subject. The type 364 can include other, or different, values. For instance, the value can be a Boolean value indicating whether or not the string value 344 is useable to identify a data subject (e.g., TRUE if it can be used to identify a data subject and FALSE otherwise), or the value can more granularly indicate a type, such as a particular type of data subject or a particular type of non-data subject data (e.g., particular types of factual information). More generally, using the example of the string value 358, a value for type 364 can indicate how sensitive the value is (for example, whether the data subject is an adult or a child), or can otherwise be used to help determine what actions are permitted for the string value.

The instance 352 also includes metadata 360 for a "Person-id" 368. "Person-id" 368 can be an identifier for a particular data subject, such as a particular individual. In some cases, when the type 364 is "identity," or another value indicating that the string value 344 indicates a particular data source, the value of "Person-id" can be the same as the string value. In other cases, the value of "Person-id" 368 can be different than the string value 356. For instance, as shown, "Person-id" 368 has an integer value of 0815. The "Person-id" 368 may be a value that uniquely identifies a data subject, which can be useful when a string value 344 does not unambiguously identify a single data subject, or when a particular data subject may be associated with multiple data values that can be used to identify the data subject (e.g., a customer may have a customer ID, a name, and a social security number, all of which can be potentially used to identify the particular individual, and thus potentially give rise to legal violations if data is not handled appropriately).

The instance 352 includes metadata 360 for "Data-id" 372. The value of "Data-id" 372 can be used to uniquely identify the data associated with all or a portion of the string value 356. The value of "Data-id" 372 may be useful, for example, when all or a portion of the string value 356 is aggregated with other data. For example, if data is created from string values 344 of multiple instances 340, the metadata of this derived data can include one or more of the "Person-id" 368 values and the "Data-id" 372 values (as well as the "type" 364 values), which can allow data associated with particular "person-id" and "data-id" values to be tracked and traced. For instance, by searching for a value of "data-id" 372, original data and derived data can be identified.

The metadata 360 of the instance 352 can include one or more values for a "Purpose" 376. The "Purpose" 376 can be one or more purposes for which processing of the data is allowed or prohibited, depending on implementation. For instance, an individual may provide permission for one or more uses of their data, such as for fulfilling an order, for contacting the individual regarding problems with their order, for marketing purposes, etc. Values corresponding to these purposes can be assigned to the "Purpose" 376 metadata. When the value of "Purpose" 376 corresponds to prohibited uses, a value might be "marketing," where actions other than marketing are permitted for that particular instance 352.

It should be appreciated that a data type 320, such as a class, and its restriction metadata 332, can be implemented in other manners without departing from the scope of the present innovations. For instance, rather than directly specifying permitted or prohibited uses of data (e.g., "Purpose" 376), the metadata 360 can include an identifier that can be associated with a particular data handling policy (which then specifies permitted or prohibited uses), which can be specific to the particular instance of the data type 320 or a particular classification of data to which the particular instance belongs, including all data associated with a data subject or a portion of the data associated with the data subject (such as data having a particular classification, such as customer records, medical records, etc.). The referenced policy can include the permitted or prohibited uses of the data instance 320. Although this implementation can result in extra operations of locating and reading the particular policy having the permitted or prohibited uses, as well as other restriction annotations, it can allow for greater flexibility by allowing the permitted and restricted uses to change dynamically without having to update the metadata 332 of each instance of the data type 320 whenever a change in permitted uses occurs.

Although this Example 3 discusses a custom string class 340, it should be appreciated that other custom classes (e.g., for primitive data types, composite data types, or abstract data types) can be implemented in an analogous manner. The base or standard class, if any, can be augmented using restriction metadata 332, including having the form of the metadata 360. In certain aspects, the restriction annotations can be implemented other than as metadata and/or other than in a data type implementation.

Example 4—Example Derivative Data Creation

According to at least certain disclosed innovations, at least a portion of restriction annotations from one data instance is transferred to another data instance, including being copied into a newly created data instance or being copied into an existing data instance. The at least a portion of the restriction annotations can be copied into the other data instance when all or a portion a value of the source instance is copied into the destination data instance.

Figure 4A:
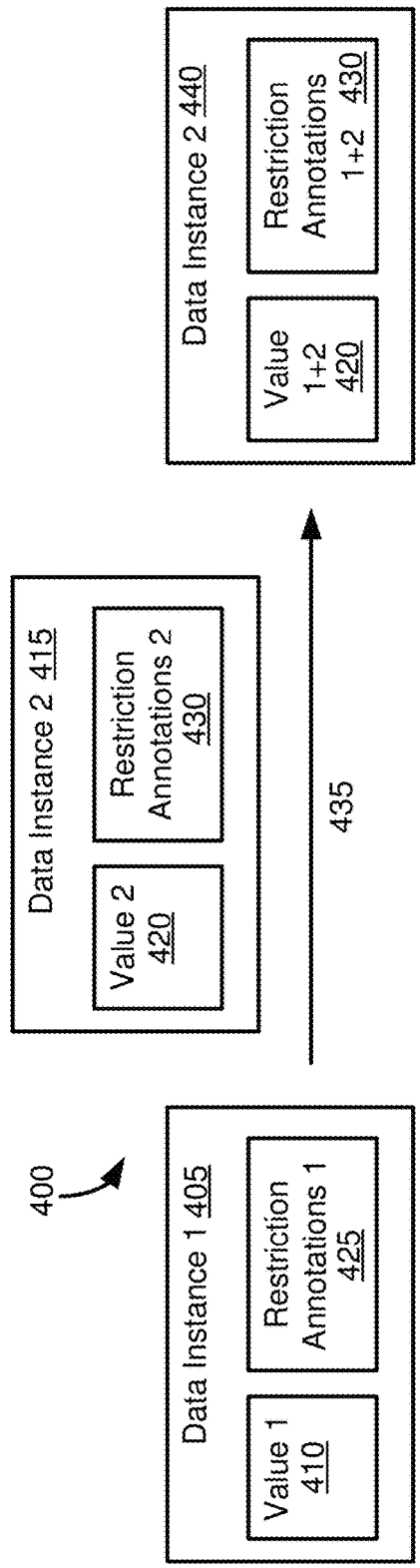
FIG. 4A is a diagram schematically depicting how a first data instance can be combined with a second data instance to create a modified second data instance having restriction annotations associated with the first data instance.

FIG. 4A illustrates an example scenario 400 where at least a portion of a data value 410 of a first data instance 405 is copied to a data value 420 of a second data instance 415. The first data instance 405 has first restriction annotations 425, and the second data instance 415 has second restriction annotations 430.

After a copy operation is performed at 435, a modified version 440 of the second data instance 415 has a data value 420 that includes the data value 410 of the first data instance 405. Similarly, the second restriction annotations 430 of the modified version 440 of the second data instance 415 includes the restriction annotations 425 of the first data instance 405. Thus, when all or a portion of the data value 410 of the first data instance 415 is used to produce derivative data, including being aggregated with other data, the first restriction annotations 425 are propagated to the derived data, helping to provide that data originating with the first data instance is used for specific purposes of the first restriction annotations.

Although shown as a copying, or aggregation, operation 475, the propagation of restriction information is not limited to any particular operation that creates derivative data. Also, although shown as having second restriction annotations 430, in some cases the second data instance 415 does not include second restriction annotations, or the restriction annotations are set to a value (e.g., a null value) representing that the data value 420 of the second data instance 415 is not subject to use restrictions (but becomes subject to use restrictions after receiving the at least a portion of the data value 410 of the first data instance).

Figure 4B:
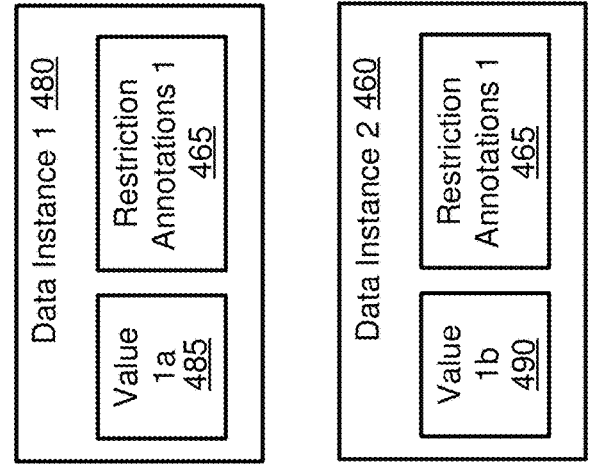
FIG. 4B is a diagram schematically depicting how a first data instance can be used to generate a second data instance having restriction annotations associated with the first data instance.

FIG. 4B illustrates a scenario 450 where a first data instance 455 is used to create a new, second data instance 460. The first data instance includes restriction annotations 465. In this case, the first data instance 455 is the subject of an operation 470 that splits a portion of a first data value 475 of the first data instance, having components 1a, 1b.

After the operation 470, a modified version 480 of the first data instance 455 includes a second data value 485 having a portion of the first data value 475, 1a, and retains the restriction annotations 465. The newly created second data instance 460 has a third data value 490 that includes the remaining portion of the first data value 475, 1b. The second data instance 460 also include the restriction annotations 465. Although the operation 470 has been described as splitting the first data value 475, the operation is not limited to any particular operation (e.g., all of first data value could be copied, a portion of the first data value could be copied, but the first data value could retain the full, original value, etc.).

Example 5—Example Data Export, Pseudonymization, and Anonymization

Figure 5:
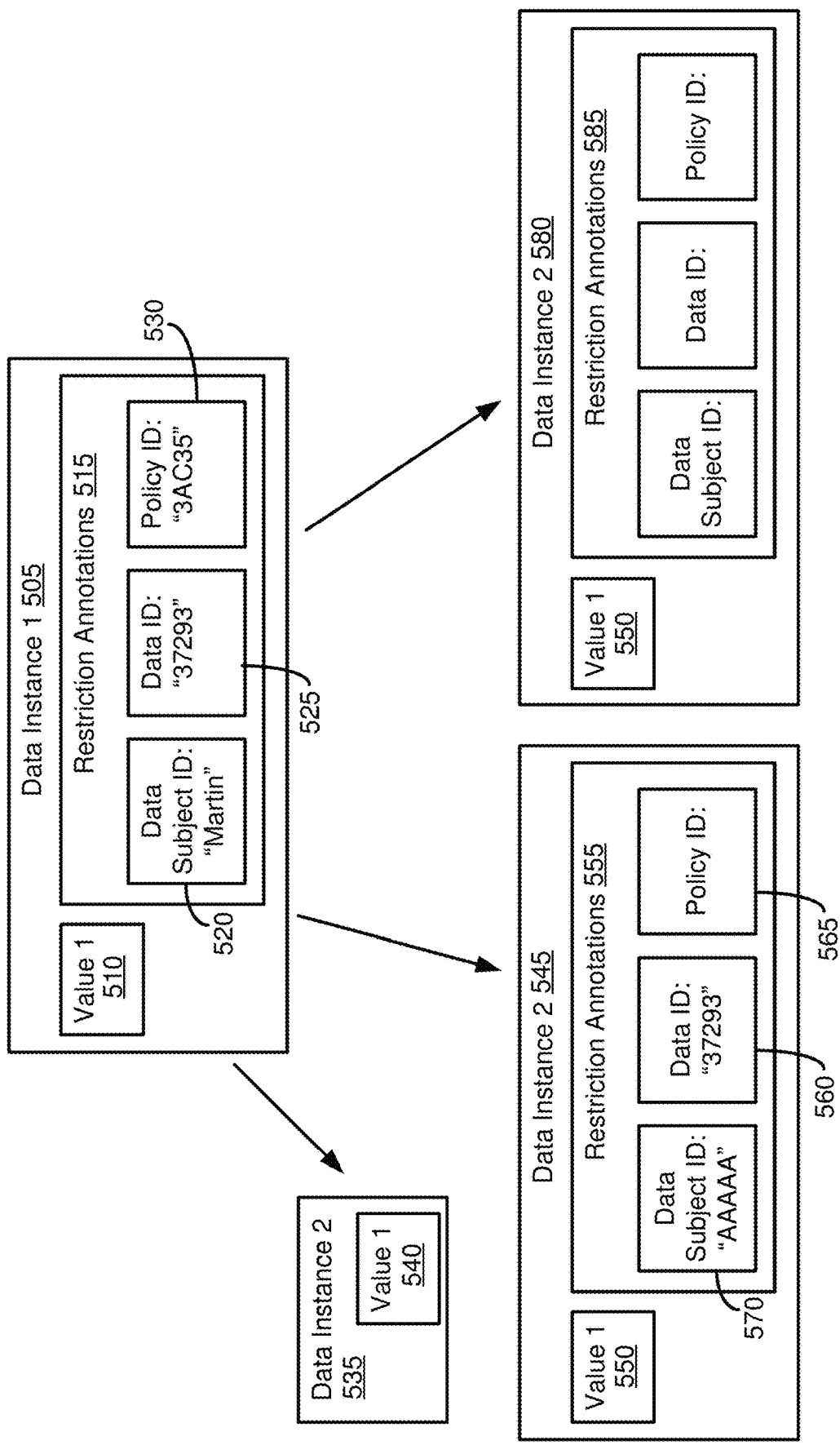
FIG. 5 is a diagram schematically depicting how a data instance can be exported into a data type lacking restriction information, can be pseudonymized, or can be anonymized.

In some cases, it may be desirable to export data in a format that does not include the restriction annotations, or that can be displayed and manipulating by systems that may not be configured to process restriction annotations, or, for example, which lack the custom data type that includes restriction annotations. That is, rather than a custom integer data type that includes restriction annotations, it may be desired to have a data value of the custom integer type represented in a standard integer type. In other cases, it may be desirable to maintain the restriction information, but to have a value of the data instance not be associable with a data subject associated with the data instance. FIG. 5 illustrates these scenarios.

FIG. 5 illustrates a first data instance 505, which includes a data value 510 and restriction annotations 515. The restriction annotations 515 include an identifier 520 of a data subject, a data identifier 525, and a policy identifier 530 (which could instead be one or more specific allowed, or disallowed, purposes).

In the case of exporting the data value 510 into a format that does not include the restriction annotations 515, the data value 510 can be copied into a second data instance 535 that has a value 540 corresponding to the data value 510. For instance, the first data instance 505 can be an instance of a custom integer data type and the second data instance 535 can be an instance of a standard, or primitive, integer data type. In at least some cases, before the data value 510 is exported (or otherwise removed from a context associated with the restriction annotations 515), the restriction annotations are checked to determine whether the export operation is permitted. At least as long as the value 540 does not identify a data subject, by itself, the data instance 535 can be considered to be anonymized. However, if the data instance 535 is provided along with other data relating to a data subject, it may be possible to determine the identity of the data subject even if no data directly identifies the data subject. Thus, at least in some cases, prior to considering a collection of data to have been anonymized, the collection of data is analyzed, such as using domain (or application) specific logic to determine whether the collection is anonymized. For instance, in a specific application, specified combinations of database fields may be considered to not be anonymized, even if individual data instances do not directly identify the data subject or have been anonymized.

Pseudonymized data instance 545 illustrates the results of applying an example pseudonymization operation to the first data instance 505. Pseudonymized data instance 545 includes a data value 550 having the value of the data value 510, and restriction annotations 555 including a data identifier 560 and a policy identifier 565 having corresponding values of the data identifier 525 and policy identifier 530 of the first data instance 505. However, the identifier 520 of the data subject of the first data instance 505 has been changed in subject identifier 570 to a pseudonym that does not identify the data subject. In at least some cases, pseudonymized data is not subject to data restrictions, and so the policy identifier 530 of the data instance 505 can be set to a policy identifier 565 having a null value or otherwise indicating that the pseudonymized data instance 545 is not subject to restriction annotations. In further examples, the data identifier 560 can be set to a null value or a value otherwise indicating that no data identifier is associated with the pseudonymized data instance 545. In yet another example, data can be pseudonymized and not associated with restriction annotations 555 (e.g., it can be analogous to data instance 535, where any "identity" data to be provided in a collection has an identifier of a data subject replaced with a pseudonym).

In some cases, a system implementing the scenario of FIG. 5 can maintain a mapping between data source identifiers and pseudonyms. In other cases, such a mapping is not maintained. As shown, the pseudonymized data instance 545 is a separate data instance from the first data instance 505. If desired, the first data instance 505 can be deleted after the pseudonymized data instance 545 is created. In other cases, both data instance 505, 545 can be maintained, at least for a period of time. In another implementation, the data subject identifier 520 can be changed to a pseudonym in the first data instance 505 without creating an additional data instance.

As shown in anonymized data instance 580, in further cases, rather than being replaced by a pseudonym, one or more (including all) of the data subject identifier 520, data identifier 525, and policy identifier 530 can be removed or set to a null value in the data subject identifier metadata 585 of the anonymized instance. Or, the data instance 580 can be the data instance 505 with the data subject identifier 520 set to null, or otherwise not indicating a data subject.

Example 6—Example Data Instances Having Common Data Subject Identifier or Data Identifier Restriction annotations can be useful for purposes other than, or in addition to, determining whether a requested operation on a data instance is authorized. For example, restriction annotations can be used to identify data instances meeting particular criteria, such as being associated with a specified data subject, a specified data identifier (e.g., to identity any derivative data), a specified purpose or policy, or another type of restriction annotation.

Figure 6:
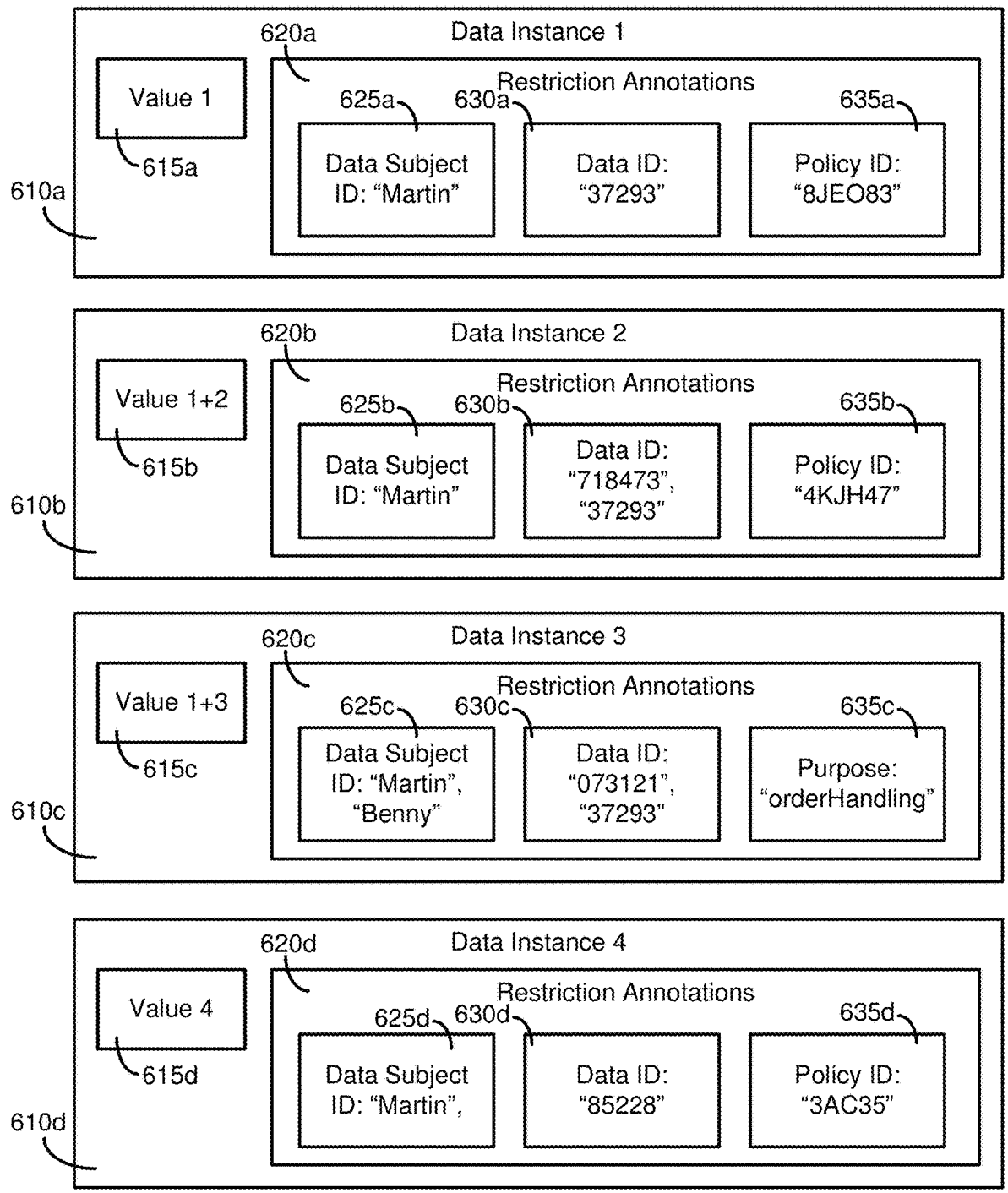
FIG. 6 is a block diagram illustrating data object instances sharing one or both of data subject identifiers and data identifiers.

FIG. 6 illustrates a plurality of data instances 610 of a data type having a value 615 and restriction annotations 620. Restriction annotations 620 can include a data subject identifier 625, a data identifier 630, and a policy or purpose identifier 635. A portion of the data instances 610 are associated with one or more common data subject identifiers 625, and another portion of the data instances are associated with one or more common data identifiers 630.

Specifically, data instances 610*a*, 610*b*, 610*c*, 610*d* have data subject identifiers 625*a*, 625*b*, 625*c*, 625*d* that include a value of "Martin." Data instance 610*c* has a data subject identifier 625*c* that also includes the value of "Benny." Thus, if it was desired to retrieve all data instances 610 associated with "Martin," such as in response to a request by Martin, the data instances could be queried and all instances 610*a*, 610*b*, 610*c*, 610*d* returned.

As another example, data instances 610*a*, 610*b*, 610*c* have data identifiers 630*a*, 630*b*, 630*c* including a value of "37293." Data instance 610*a* may be, for example, an original or source data instance, and data instances 610*b*, 610*c* may represent derivative data. If it was desired to retrieve all data instances 610 associated with data identifier "37293," the data instances could be queries and data instances 610*a*, 610*b*, 610*c* would be returned.

Example 7—Example Data Type Implementations

FIG. 7 illustrates an example class definition 700 for a custom string class, which can be, or be analogous to, the custom string data type 340 of FIG. 3. As discussed in Example 3, a custom string class is provided by way of illustration only, and other custom data types can be implemented in an analogous manner.

A string class definition 700 generally includes one or more data members 704 and one or more methods 708. The data members 704 can include one or more specific data members 712 associated with a value of an instance of the string class. For instance, for a custom implementation of a primitive type, the data member 712 can be an instance of the base, or standard, primitive data type. In some cases, even for constructed or abstract data types, the data member 712 associated with the value of an instance of the data type can be an instance of the base, or standard data type. In other cases, the data members 704 can have data members corresponding to at least a portion, and in at least some case, all of the data members of the base, or standard, data type (including regarding of whether those data members might be classified as "values" or metadata).

In addition to the one or more data members 712 associated with values or data members (including for values or metadata) of the base, or standard, data type, the string class definition 700 includes at least one data member 716 associated with restriction metadata. In one implementation, the data member 716 can be a vector (or an array or other data structure) of a data type for restriction metadata, such as an abstract or composite data type.

FIG. 7 illustrates an example class definition 720 for a restrictionMetadata class. If desired, the restrictionMetadata class could be implemented as a struct. The restriction metadata class definition 720 can include one or more data members 724. In particular, the data members 724 can include a personID 728 and a dataID 732, which can be analogous to the "person-ID" and "data-ID" discussed in association with FIG. 3 and Example 3. In the specific implementation of FIG. 7, the data members 728, 732 are implemented as vectors of integers, but could be implemented as another data type (including being of different data types), including as data members having a single value, as opposed to a data structure capable of storing multiple values.

The data members 724 also include a myEvent data member 736, representing an event that will trigger a particular action. The eventType datatype may define, for example, an event trigger, such as a particular event (such as an event related to a purpose of an associated string class instance) or a particular date. For instance, myEvent 736 can be associated with a value that indicates a date after which an instance of the string class 700 should not be used, a date after which the instance should be deleted, or some other action that should be taken. The data members 724 can include one or more dates, not shown, including a date at which the associated string class instance was created.

The data members 724 include a protectionStatus 740, which can correspond to the type 364 of FIG. 3 and Example 3. ProtectionStatus 740 is shown implemented as an abstract data type (or enumerated data type or other data type) of protectionClass, which can specify, for example, whether a particular instance of the string class 700 indicates a particular data subject (or type or class of data subject) or something other than data that indicates a particular data subject, such as factual information, or a particular type of factual information. Of course, protectionStatus 740 can be implemented in another manner, including, as described above, a Boolean value.

The data members 724 are shown as including both allowedPurposes 744 and blockedPurposes 748. In a particular example, allowedPurposes 744 and blockedPurposes 748 can be implemented as a vector (or an array or another data structure). AllowedPurposes 744 can correspond to the Purpose 376 of FIG. 3. In some cases, the restriction metadata class definition 720 includes one of allowedPurposes 744 and blockedPurposes 748. Additionally, rather than potentially having multiple values, allowedPurposes 744 or blockedPurposes 748 can have a single value (e.g., not being implemented as vector or other data structure). As described, rather than specifically enumerating allowed or blocked purposes, purposes can be determined by referencing a particular policy that includes blocked or allowed purposes. Thus, in some cases, the restrictionMetadata class definition 720 can have one or more data members 724 indicating one or more policies in which allowed or blocked purposes are enumerated.

In some cases, a computing device can record activities associated with data having restriction metadata. For instance, the computing device may record activities associated with one or more of accessing data, manipulating data, transferring data, outputting data, and the like. In this way, it can be determined what uses have been made of particular data or how the data was modified. For instance, in some cases, it may be legally required that a data subject, such as an individual, be informed about how their data has been used or manipulated. Accordingly, the restrictionMetadata class 720 can include a writeLog method 752 that can write entries to a logEntries data member 750. The writeLog method 752 can write to a file, memory, or other form of computer-readable storage (e.g., memory or persistent storage such as disk), or optionally, to analog output such as a monitor or a printer.

Log entries can include any information that is desired to be recorded regarding the processing and use of instances of the string class 700. In particular examples, log entries can include one or more of an identifier for an application that processed the instance in some manner, an identifier for a type of action that was performed on the data (e.g., generating derivative data, reading the data, modifying the data, transmitting the data to another computer device, displaying the data), a time the action was carried out (e.g., requested or completed), and an identifier of a user associated with the action (e.g., a particular individual accessing the application that processed the data). In particular, log entries can be useful in resolving situations where data might be associated with contradictory data (e.g., derivative data being inconsistent with source data). The log entries can include more, less, or different information that shown in FIG. 7. In some cases, certain types of data, for example, highly sensitive data (such as indicated by a value of protectionStatus 740, discussed below), can be excluded from a log, or from logging activity, such as logging activity by a system or application (as opposed to the logs generated using the writeLog method 752). In others aspects, the writeLog method 752 can be disabled for particular instances of the restrictionMetadata class 720.

An example log (e.g., entries in the data member 750) can be:

var_name=Benny, created-on: <timestamp>
var_name=Benny, created-by: <name> var_name=Benny, modified-on: <timestamp>
var_name=Benny, modified-by: <name>

Log entries can be associated with one or more of a data identifier and a data subject identifier, such as the personID 728 or the dataID 732. In this way, log entries for particular data of particular data subjects can be identified and retrieved. For instance, a data administrator, or the data subject, may wish to review how their data has been handled, as well as the corresponding data itself. Access to the data, including it associated log files, can be provided by a viewLog method of the custom string class 700.

The restrictionMetadata class definition 720 can include one or more methods to construct and destruct instances of the class, including a default constructor 756 and a destructor 760. Although not shown, the restrictionMetadata class definition 720 can include other types of constructors, including a copy constructor. If desired, the restrictionMetadata class definition 720 can include other methods. For instance, one or more of the data members 724 can be made private, and public methods can be provided to set or get values of the data members.

The methods 708 for the custom string class 700 can include one or more methods for constructing instances of the class, and a method for destructing class instances. In particular, the methods 708 are shown as including a default constructor 764, a copy constructor 766, and a destructor 768. The methods 708 can include other types of constructors, if desired.

The methods 708 can include methods 770 for getting or setting the stringValue 712, or for getting or setting values associated with the restrictionValues data member 716. For instance, methods 772 may be provided to add or remove restrictionMetadata instances from the restrictionValues 716 data member. Methods 774 may be provided for setting or getting the data members 724 of a particular restrictionValue instance of the restrictionValues data member 716, including at a specified index position of the vector. In particular, methods 776 can be provided for determining whether a particular purposes is permitted (or, in some cases, prohibited) or to obtain the values of the allowedPurposes 744 or blockedPurposes 748 data members of all of a portion of the restrictionMetadata instances of the restriction values data member 716.

Methods 708 can include methods that provide additional functionality. For instance, a method 778 can be provided to anonymize a string class instance. Anonymizing the instance can include determining that the instance is not associated with any data useable to identify a data subject associated with the instance. If the data is not associated with data useable to identify a data source, the stringValue 712 data member can be provided as an output or return value. Although not shown, instead of, or in addition to, an anonymization method 778, a method can be provided to pseudonymize an instance of the string class. In a particular example, pseudonymization can involve replacing all values of the stringValue data member 712 for data instances associated with an "identity" value for the protectionStatus data member 744 with a value that is not associable with the data source indicated by the personID data member 728.

As is further discussed in the present disclosure, in some cases, in addition to considering whether a single data instance (e.g., an instance of the custom string class 700 or another annotated data type) reveals personal data or other restricted information, it should be considered whether any data that is being processed, displayed, transferred, etc. might reveal restricted information, either by itself or combined with other data in a collection. For instance, a sufficient collection of factual data might be used to identify an individual, even if no single data instance in the collection directly or specifically identifies the individual. In particular aspects, the custom string class 700 can include a data member 704 that aggregates all instances of the class (or particular values of the dataID 732 of the corresponding instances of the restrictionMetadata class 720) associated with a particular data collection that is to be analyzed to determine whether restricted information (e.g., personal data) might be revealed, or to which anonymization or pseudonymization methods are to be applied. In particular implementations, the analysis of whether restriction information may be revealed, or how anonymization or pseudonymization should be applied, is domain (e.g. use/application) specific, and can be implemented by particular applications. The disclosed innovations, including the classes in FIG. 7, can serve as an interface to obtain relevant data to facilitate such domain/application-level determinations and actions. Or, the provided framework can otherwise be modified to provide such functionality.

As an example, an application can include functionality to pseudonymize or anonymize a collection of data that might reveal restricted information. The disclosed innovations can facilitate the anonymization/pseudonymization, and provide methods to confirm that a collection of data does not reveal restricted information (for instance, does not include any data having a protectionStatus 740 of "identity"). For instance, a financial application may store information for customers, including a name, an account number, and an account balance. The name and account number may have a protectionStatus 740 of "identity," while the account balance may have a protectionStatus of "fact." The financial application can include a pseudonymization function (e.g., pseudonymize_account(data)) that replaces the name and account number with pseudonyms (e.g., "Benny" is replaced with "AAAA" and account number "145632" is replaced with "0000000"). Before a data collection is processed in a particular manner, such as being transmitted or displayed, a pseudonymization check, which can be implemented by an interface (e.g., check_pseudonmyized(set)) according to a disclosed innovation, can be carried out, which determines, for example, whether all data instances in the collection are associated with a protectionStatus 740 of "fact." If so, the display/transmission can be executed. If not, the operation can be cancelled, and, optionally, an exception, an error, or error message can be generated, or similar action taken.

The methods 708 can include methods 780 for displaying or otherwise outputting (e.g., exporting in a machine-readable format) the stringValue 712 or displaying or otherwise outputting a log associated with one or more, including all, of the restrictionMetadata instances of the restrictionValues data member 716.

An advantage provided by at least certain disclosed innovations is the ability for restrictionMetadata instances associated with an instance of a string class object to be linked with the corresponding value, and to be propagated to derived data. Methods that create derivative data, or transfer all or a portion of the stringValue 712, can ensure that the relevant restrictionMetadata instances, or all or a portion of their data member values, are included in the derived or output data. For instance, operators 782 that manipulate the string class can be overloaded, and the implementation of the overloaded operator can carry out the appropriate function with respect to the string value, and see that the restriction metadata is properly associated with any resultant data or operation.

As an example, the overloaded addition operator may function to concatenate strings. In addition to concatenating the stringValues 712 for two instances of the custom string class, the overloaded addition operator can combine the restriction metadata. For example, the restrictionValues 716 data member can include a restrictionMetadata instance corresponding to each of the concatenated instances of the custom string class.

The class implementations 700 and 720 are provided by way of example only. For instance, the class implementations 700 and 720 are shown and described at least generally in the syntax of C++ classes. However, the functionality can be implemented an appropriate manner for a particular computing language being used. In addition, the functionality need not be implemented exactly in the manner shown. For instance, rather than being included as a separate class, one or more of the data members 724 or the writeLog function 752 can be included in the implementation of the custom string class 700.

Figure 8:
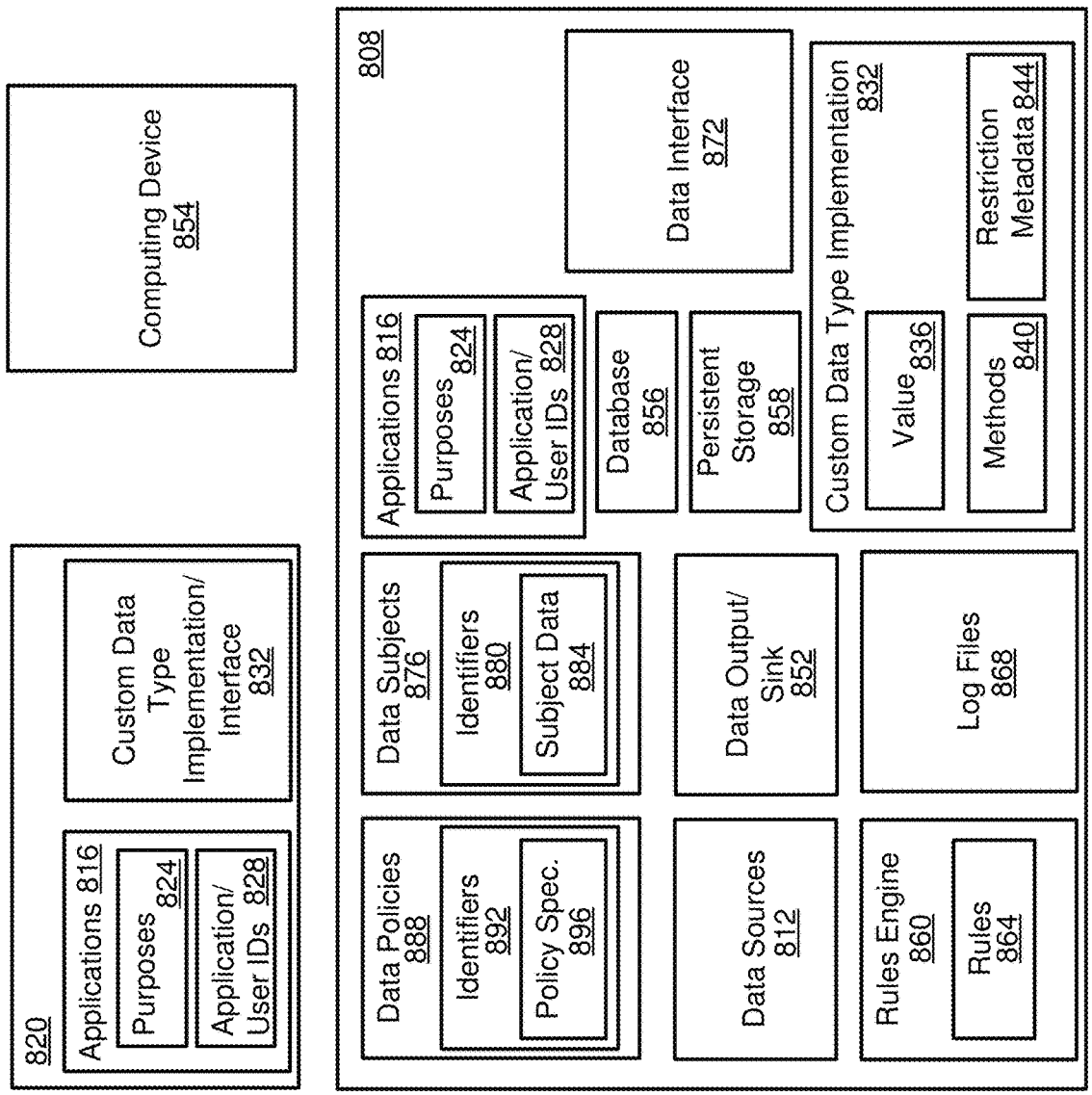
FIG. 8 is a block diagram illustrating an example software architecture in which a computer device, a remote computer device, and additionally another computer device, can use a custom data type implementation to track and enforce use restrictions for instances of the custom data type.

Example 8—Example Architecture with Custom Data Type Having Restriction Annotations FIG. 8 illustrates an example architecture 800 in which one or more of the disclosed innovations can be implemented. The architecture 800 includes a computer device (or system, such as a collection of computer device) 808. The computer device 808 can include one or more data sources 812. A data source 812 can be a component in which restricted data (or data that can subject to restrictions) is entered or stored, such as a source from which restricted data can be obtained. A data source 812 can be, for example, a user interface, a database, a computer readable storage medium (e.g., memory or a disk), or an interface between computing devices or systems (or applications).

In some cases, data in a data source 812 can be associated with restriction annotations when it is initially provided to the data source. In other cases, data in the data source 812 can be associated with restriction annotations at a point after which it was provided to, or generated by, the data source. In a particular example, a software application 816 can specify particular restriction annotations to be associated with the data when the data is created in the application, when it is provided by the application to the data source 812, or after the data has been provided by an application to the data source. For instance, the application 816 can call an API method to associate the data with restriction information. As an example of restricted data that is generated by a data source, the data source (such as program routines), can generate, such as dynamically, an identifier (e.g. a customer identifier value) for a particular data subject, which can then be associated with restriction annotations. In some cases, restriction annotations, or a policy, can specify that a data instance is currently unrestricted (e.g., is available for any purpose and for any action).

In some cases, the application 816 can be located at the computing device 808. In other cases, the application 816 can be located at a computing device 820, which can be a remote computing device. An application 816 can include one or more purposes 824 (or can be associated with one or more policies, which in turn case be associated with purposes) and an application ID or a user ID 828. The purposes 824 and application or user IDs 828 may be used to assign restriction metadata to data received or processed by an application 816.

Operations to create, as well as to modify, restriction metadata and values associated with data can be implemented using a custom data type implementation 832. The architecture 800 can include a single custom data type implementation 832 or multiple custom data type implementations (e.g., a custom data type corresponding to a string, a custom data type corresponding to an integer, a custom data type implementing an abstract data type).

In some cases, the custom data type implementation 832 can be used in place of, or in addition to, a base or standard data type (e.g., the computer device 808 or remote computer device 820 can have a programming language that includes a standard integer data type and a custom integer data type that includes restriction annotations, such as in the form of metadata, which can be implemented as data members of the custom data type). In other cases, the disclosed innovations can be implemented using the custom data type implementation 832 as the sole, or sui generis, data type. However, at least in some aspects, instances of the custom data type implementation 832 can be converted (e.g., cast, coerced, or otherwise converted) into a common or standard data type, such as a primitive data type. For instance, the custom data type implementation 832 can include a method to convert an instance of the data type into standard (such as primitive) data types, such as integers, characters, and standard string implementations. Or, the method may simply write all of the relevant information (e.g., the data values, but not the restriction metadata) as a series of characters, such as in a text file, that another computer system may read and interpret as other data types (e.g., read as primitive data types).

In some cases, when an application 816 is executed on the remote computer device 820, the remote computer device can include the custom data type implementation 832. In other cases, the remote computer device 820 does not include the custom data type implementation 832, but can access interface methods to manipulate data stored in the computer device 808 (e.g., for accessing data members or methods of the custom data type implementation 832 of the computer device 808).

Taking a specific example, assume a user inputs a first name of "Benny," such through a user interface. "Benny" can be assigned as a value 836 for an instance of the custom data type 832 (e.g., "Benny" can be assigned as the string value). A computer device associated with the user input (which can be a computer device providing a user interface to the user, or a computer device in communication with a computer device providing a user interface to the user) can call methods (e.g., methods 840) to set values for data members corresponding to restriction metadata 844. The system may, for instance, automatically associate the data input by the user with a user ID for the user, an identifier for the data is received, a type (such as if a field in which the user information is associated with an identifier type or a fact type).

When the annotation occurs via call to a method 840, the call can include arguments for various properties to be associated with the restriction metadata 844, such as one or more of a user id, an application id, a timestamp, a data id, a data source id, and one or more purposes or policies. The purposes or policies can be specifically indicated by the data source 812 (e.g., the individual Benny can choose purposes or policies to be applied to the data), or can be assigned by the application 816, such as based on a purpose associated with the application, or a particular purpose associated with the user interface, or an element thereof (e.g., a string for the name may be used for establishing an account, where the account is associated with certain default purposes, for which the user may be required to provide consent before the account is established).

The above scenario can be realized by the following pseudocode, where data values are assigned to an instance of the custom data type implementation 832 with the identifier "name":

var name="alice";
    name.personalData.addPersonId("0815");
    name.personalData.addDataId("1337");
    name.personalData.addType("identity");
    name.personalData.addPurpose("Order-Handling");
    name.personalData.addPurpose("SnailMail-Marketing");
    name.personalData.addPurpose("Email-Marketing");

When at least certain operations are to be performed on an instance of a custom data type 832 associated with restriction metadata 844, it can be determined whether the operations are legally compliant, including with purpose restrictions indicated in the restriction metadata. An operation or component that may potentially violate a purpose associated with the restriction metadata 844 for a particular data instance can be referred to as a sink, shown in FIG. 8 as sink 852. Sinks 852 can involve outputting data, such as displaying or printing data, or transmitting data, such as by email or over a network to another computer device (e.g. the computer devices 820 or 854). Thus, a user interface can be a sink 852. Storing data, such as in a database 856 (e.g., a SQL database, such as the HANA database of SAP SE of Walldorf, Germany, or a document store, such as MongoDB of MongoDB Inc. of New York, N.Y.) or in a persistent storage medium 858 can violate data purposes, and so can be a sink 852. Processing by an application 816 can also be a sink 852, if the purpose 824 of the processing is inconsistent with a purpose associated with the data. In some cases, sinks 852 can be defined with respect to a purpose, including with respect to a policy that specifies one or more purposes.

In the case of transferring data to the remote computer devices 820, 854, in at least some implementations, the data can be transferred along with any restriction metadata 844. The data can also be transferred with any supporting information that may be desirable, such as information associated with a data subject associated with the data and information associated with any use policies associate with the data. In some cases, the remote computer devices 820, 854 can include the custom data type implementation 832. In other cases, the remote computer devices 820, 854 can use the restriction annotations in another manner.

Determining whether the purpose of the processing is inconsistent with a purpose associated with the data (e.g., reflected in the restriction metadata 844 of an instance of the custom data type 832) can be carried out using a rules engine 860. The rules engine 860 can access one or more rules 864. Rules 864 can be comparatively simple rules (e.g., do purposes match or not, is "identity" data included), or can be more complex rules.

Although shown as a separate component, the rules engine 860 can be implemented in another manner, such as being part of an application 816. For instance, an application 816 can include logic to determine whether a use of the data is permitted before an operation is carried out. Or, the rules engine 860 can be implemented as part of the custom data type implantation 832. In a specific example, an operation can be carried out using a method 840, and the method may include a rule check (e.g. implementing the rules engine 860), or a call to a separate rule engine.

In some cases, determining whether an operation is permitted can include determining whether a purpose associated with the operation (such as a purpose associated with an application 816, or an application, making the request) is consistent with any restrictions (e.g., restricted purposes) associated with the data. In some cases, this determining can involve determining whether a purpose of a program (e.g., email marketing) matches a defined, allowed purpose for the data, specified in the restriction metadata 844 for the data. If the purposes match, the operation is allowed. If the purposes do not match, the operation is not executed and, optionally, an error message is returned to the application 816 or user. Example pseudocode for checking to see whether a particular purpose is allowed for particular data (using the name string object from above):

name.personalData.checkPurpose("Email-Marketing");

Where the method returns true if email marketing is an allowed purpose and false otherwise.

As previously discussed, purpose checking can be implemented in other manners. For instance, rather than checking to see if a purpose is specifically allowed (e.g., a white list), a check can be made to determine whether a purpose is specifically disallowed (e.g., a black list). In the latter case, the action would be allowed so long as any purposes sent as arguments to the check function were not identified in the restriction metadata 844 for the name string object. The check can be implemented in other manners. For example, a method call can be used to explicitly obtain purpose/policy information associated with the data, and the results compared with purposes associated with the operation.

In another aspect, before particular operations are carried out, it can be determined whether an operation would result in unconsented display or other dissemination of data association with restriction metadata 844. For instance, even if an application uses data for an allowed purposes, certain operations, such as dissemination of information to third parties, may violate a purpose, policy, or other type of restriction associated with the data. In such cases, instead of, or in addition to, determining whether a purpose associated with the operation is a permitted purpose (including not being a disallowed purpose), it can be determined whether the operation involves data that could be used to identify the data subject (e.g., individual) with which it is associated. As an example, releasing a person's name may be, by itself, a violation. Or, releasing a person's name in association with other information about the person may be a violation. However, releasing factual information regarding the individual, so long as the information cannot be linked to the individual, may not be a violation. For instance, if data is being aggregated (such as the total amount of outstanding invoices of a company), that number may not be traceable to any individual customer, and so may not raise concerns of potential violations. Thus, it can be determined whether the operation is associated with any data having a restricted type, such as "identity," as opposed to data associated with an unrestricted type, such as "fact."

When operations are carried out with data associated with restriction metadata 844, log files 868 can be generated. The logs files 868 can have entries for at least certain, and in some cases all, action performed on the data. In some cases, operations that are to be included in a log can be associated with methods that write a corresponding log entry. For instance, a call to a method 840 to create data can include an operation to write a log entry indicating the creation of the data. As another example, an action that transfers data to a sink 852 can generate a log entry. In some cases, rather than, or in addition to, having separate log files 868, log information can be maintained in the custom data type implementation 832, such as in the restriction metadata 844.

The computer device 808 can include a data interface 872. The data interface 872 can allow a user, including a data administrator or a data subject, to obtain information regarding instances of the custom data type 832 or the log files 868. For example, a data subject may use the data interface 872 to search for all custom data type instances that involve their data, or to view log files 868 associated with such data. Example operations using the data interface to get all data associated with a subject identifier (such as for "Martin," having an identifier of 0815), to delete all such data, or to export a machine readable copy of all such data can include:
    privacy_store.getByPersonId(0815);
    privacy_store.DelByPersonID(0815);
    privacy_store.ExpByPersonID(0815);

In some cases, a data subject identifier, such as associated with restriction metadata 844, can be associated data subject information in a data subject store 876 (which can be, in some cases, stored in the database 856). The data subject store 876 can include data subject identifiers 880 and, for each data subject identifier, data subject data 884. The data subject data 884 can list data identifiers for a data subject (e.g., a name, phone number, email address, customer id, employee id) or other data associated with the data subject (including factual data), or list data identifiers associated with the data (e.g., useable to identify instances of the custom data type 832 associated with the data subject). In some aspects, the data subject data 884 can include restriction metadata 844 for the data subject, such as specifying one or more acceptable or prohibited uses/purposes for the data, or specifying a policy containing such purposes.

In some cases, restriction metadata 844 can directly specify authorized or prohibited purposes or uses of data subject data. In other cases, the restriction metadata 844 can specify a particular policy, where the policy contains the permitted or prohibited uses. For example, policies can be stored in a data policy store 888. The data policy store 888 can include one or more identifiers 892 for data policies, and each data policy can have a specification 896. The specification 896 can list one or more permitted purposes or policies or prohibited purposes or policies.

The architecture 800 can include more or fewer components than shown, and may be organized in other manners. For example, functionality of a particular component can be carried out by another component. In addition, in at least some cases, functionality can be carried out using multiple components. In a specific example, all or a portion of the functionality of two or more of the rules engine 860, the custom data type implementation 832, the log files 868, the data interface 872, and the data policies 888 may be combined.

Example 9—Example Assignment of Restriction Annotations and Use Checking

Figure 9:
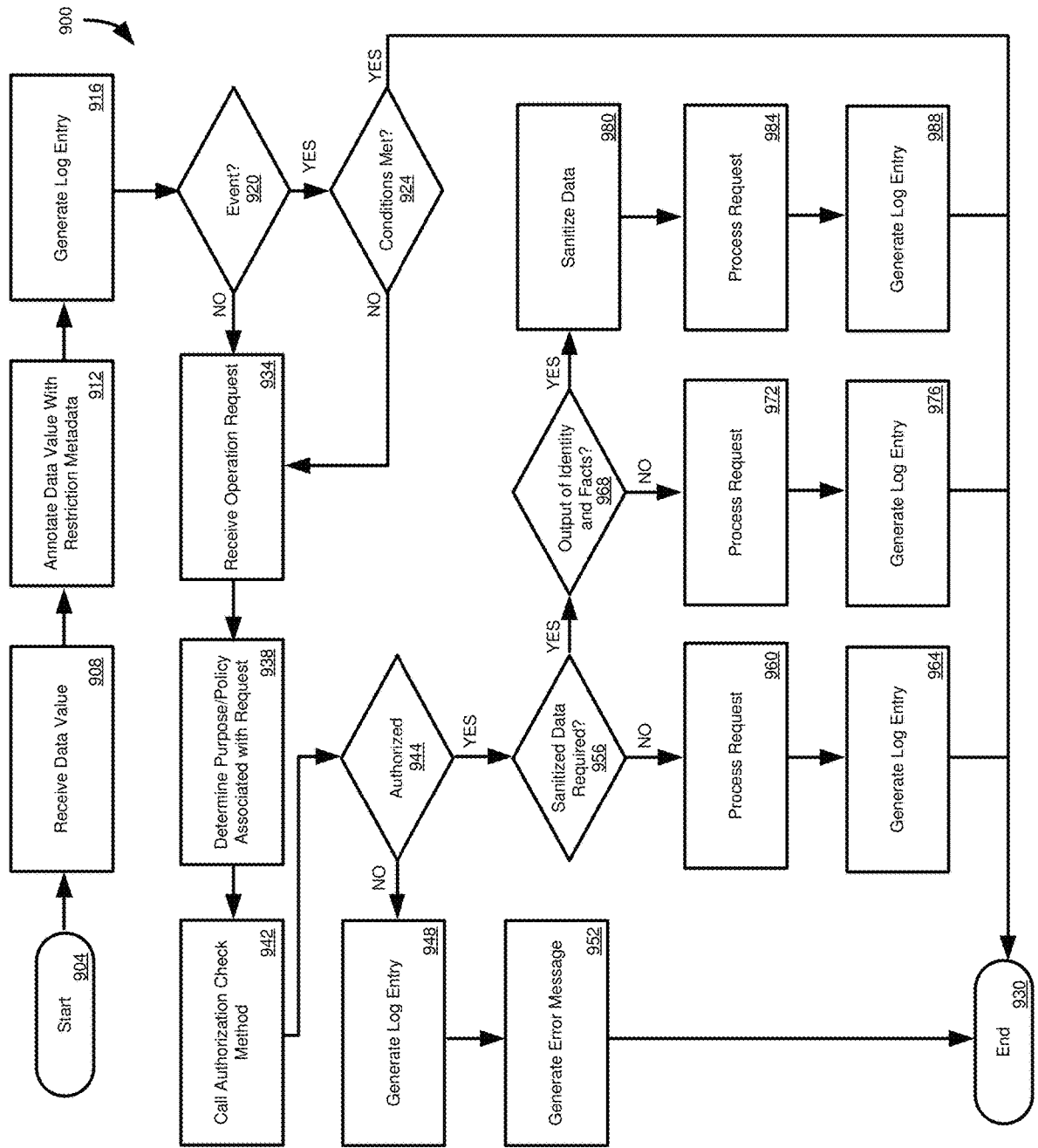
FIG. 9 is a flowchart of a method for associating use restrictions with a data value and determining whether an operation request is permitted based on the use restrictions.

FIG. 9 illustrates a flowchart of an example method 900 for creating data associated with restriction annotations and using the restriction annotations to determine whether a request for an operation involving the data is authorized. The method 900 beings at 904. At 908, a data value is received. The data value may be received from various sources, which can generally be a place where data is entered or stored. Example data sources include user interfaces, a database, a file, a network, an input device (e.g., a keyboard, a pointing device, a microphone), a communication from an application (which can be an external application or an application, or program routines, running the process 900), and the like.

The data value can be assigned to an instance of a data type. The data type is configured to accept the value, and to provide restriction metadata. In some cases, the value and restriction metadata can be implemented as data members of the data type (e.g., data members of a class or other abstract or composite data type). In some implementations, when the data value is assigned to the instance, the restriction metadata can be unspecified, such as having (or referencing a policy having) a default value or a value that indicates that the instance is not subject to data restriction (which can also be a default value). In some cases, the instance (e.g., its value) can be used for at least a period of time without having restriction metadata that specifies use restrictions for the instance.

At some point, which can be when the instance is instantiated, when the value is assigned to the instance, or at another, such as a later, time, the value is annotated with restriction metadata at 912. For example, one or more data members of the instance, corresponding to the restriction metadata, can be assigned one or more values. The one or more values can include a data subject identifier (e.g., an identifier for a particular individual), a data identifier (e.g., an identifier that can be used to track all or a portion of the value, including when all or a portion of the value is included in derivative data), one or more use restrictions, and one or more conditions regarding the use or validity of the instance, such as an event upon the occurrence of which the instance will be deleted.

In some cases, the data subject identifier or the data identifier can be useable to locate one or more use restrictions for the instance, such as in a data store (e.g., a database) that stores a policy to be applied to the data. Or, the restriction metadata can include a policy identifier that is to be applied to the data, where the policy can be stored separately from the instance, but accessed to determine data use restrictions applicable to the instance. Although the instance has been described as being assigned a value and then being assigned restriction metadata, in some cases the value and the restriction metadata can be concurrently assigned, or the restriction metadata can be assigned before the value is assigned (including being assigned when a data binding is defined for the instance, but before an actual value is assigned to the instance).

Optionally, at 916, a log entry is generated. The log entry can indicate when the instance was created, as well as information such as a user who entered the information, a data source for the information, or an application that created the instance. In some cases, the log entry is written after the metadata is assigned at 912. In other cases, the log entry can be written at another time, such as when the value is assigned to the instance, or when the instance is created, even if no value, or restriction metadata, has yet been assigned to the instance.

Data values, such as a data value of a data instance associated with restriction annotations, can be associated with an event where, upon the occurrence of the event, the data value (or entire data instance) is deleted, or further processing of the data value (or entire data instance) is not allowed. It can be periodically determined, such as at 920, whether the data value is associated with an event. If the data value is associated with an event, it can be determined at 924 whether the event conditions have been met. If the event conditions have been met, the method 900 can end at 930, as further processing with the value may not be permitted. If it is determined at 920 that the data value is not associated with an event, or it is determined at 924 that the event conditions have not been met, the method 900 can proceed to 934, where an operation request is received.

The request for an operation received at 934 is associated with one or more uses. For instance, the request may be associated with an application that is in turn associated with the one or more uses, including being associated with a policy that specifies one or more uses. The purpose or policy associated with the request is determined at 938. An authorization check method is called at 942. For instance, a method call may include one or more uses associated with the request, and the one or more uses can be compared with use restrictions associated with the restriction metadata of the instance. In some cases, the check method can determine whether the one or more uses in the request correspond to uses specified in the restriction metadata, where, if there is a match, the use is authorized. In other cases, the check method can determine whether the one or more uses in the request do not correspond with uses specified in the restriction metadata, where, if there is not a match, the use is authorized. In other aspects, determining whether a request is authorized can be carried out in another manner. For instance, uses associated with the restriction metadata of the instance can be received and compared with the one or more uses associated with the request.

It is determined at 944 whether the operation is authorized, such as based on the results of the check method called at 942. If the operation is not authorized, a log entry can optionally be generated at 948. The log entry can include one or more of a time associated with the request, an identifier associated with the request (such as an indication of a type of the request), and an identifier associated with the source of the request (e.g., a particular application, process, or user). The log entry can include other information if desired.

Optionally, at 952, an error message can be returned to the requesting user or application, such as a message indicating the requested operation is not permitted, including an indication of the use that is not permitted. The message may also suggest, or trigger the execution of, measures to resolve the error, such as prompting a data subject for consent for the desired use. The method can end at 930.

If, at 944, the operation was determined to be authorized, in some cases, the operation can be executed and optionally, a log entry generated, such as generally described for block 916. In other cases, at 956, it can be determined whether the operation is to be used with sanitized data—that is, data that cannot be associated with a data subject. The determination at 956 can include determining whether any data associated with the requested operation includes data value has a value associated with a data subject (e.g., has the type "identity"). If none of the data associated with the operation can be associated with a data subject, the request can be processed at 960, a log entry optionally generated (which can be implemented generally as described above for the log entries generated at 916 or 948) at 964, and the method 900 can end at 930.

If it was determined at 956 that sanitized data is needed. It can be determined at 968 if the data associated with the request can be used to identify a data subject. Data being useable to identify a data subject can include an identifier for the data subject being included in the data, or the data being otherwise sufficient to identify a data subject (e.g., a large enough collection of "fact" data may be sufficient to identify the data subject). If the data cannot be used to identify a data subject, the request can be processed at 972 and a log entry optionally generated a 976, analogous to blocks 960 and 964. If it is determined at 964 that data associated with the request can be used to identify a data subject, the data can be sanitized at 980. Sanitizing the data at 980 can include anonymizing the data (e.g., removing data that could be used to associate the remaining data with a particular data subject) or pseudonymizing the data (e.g., associating the data with a "fake" identity rather than the actual identity of the data subject). After the data is sanitized, the request is processed at 984, a log entry is optionally generated at 988, which can be analogous to blocks 960 and 964, and the method 900 can end at 930.

Figure 10:
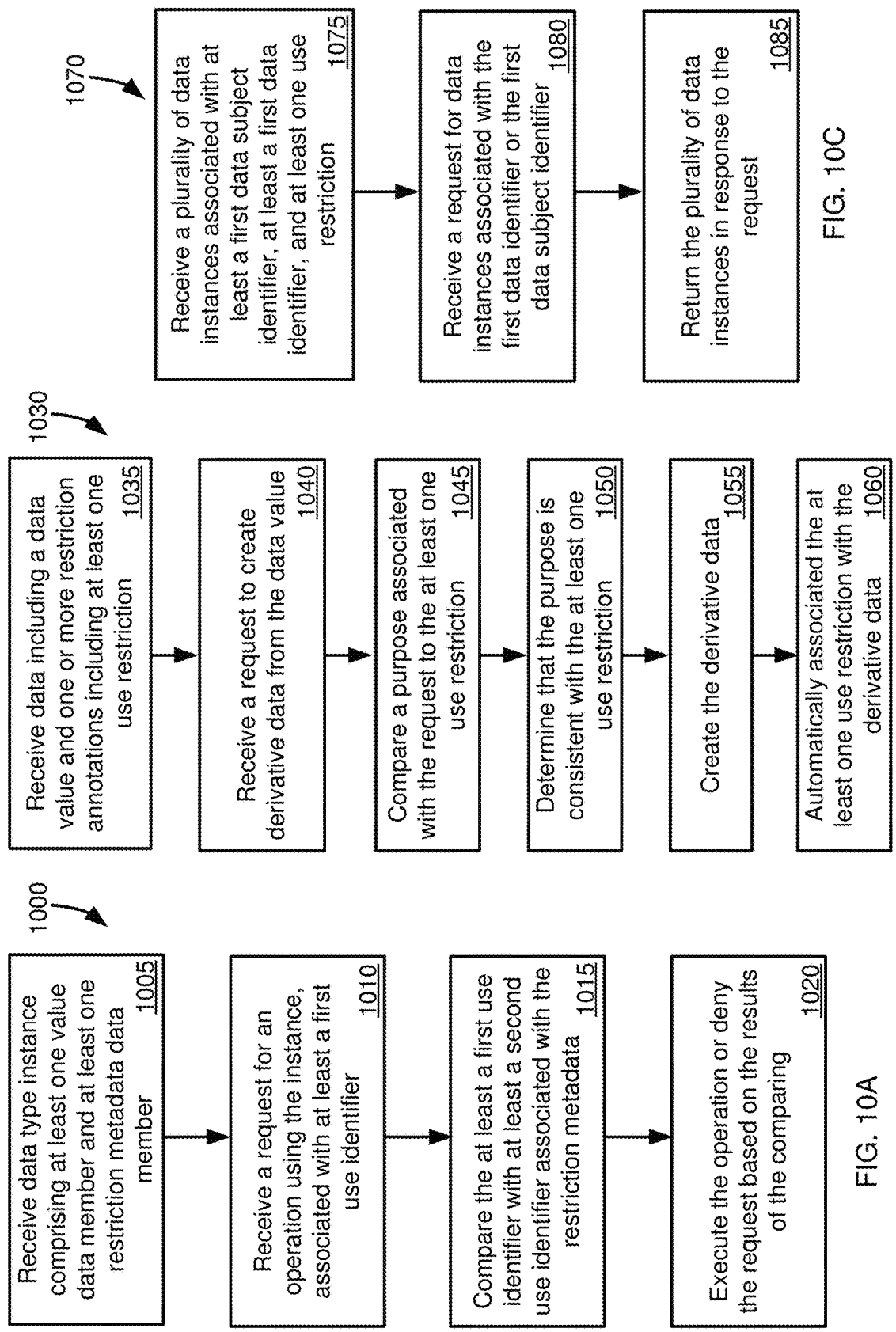
FIG. 10A is a flowchart of a method for determining whether a request for an operation using a data type instance is permitted using a use identifier of the request and at least one restriction metadata member of the data type instance.
FIG. 10B is a flowchart of a method for determining whether the creation of derivative data is authorized and automatically associated use restrictions with the derivative data.
FIG. 10C is a flowchart of a method for retrieving data instances associated with a specified data identifier or data subject identifier.

Example 10—Example Methods for Use Checking, Derivative Data Creation, and Data Collection Retrieval FIG. 10A illustrates a flowchart of an example method 1000 for selectively executing an operation request for a data type instance based on whether use restrictions for the operation request comport with use identifiers for the data type instance. In particular aspects, the method 1000 can be carried out using the architecture 800 of FIG. 8.

At 1005, a data type instance is received that includes at least one data member representing a data value and at least one data member representing restriction metadata. A request for an operation using the data type instance is received at 1010. The request is associated with at least a first use identifier. At 1015, the at least a first use identifier is compared with at least a second use identifier associated with the restriction metadata. Based on the comparing, the operation is executed, or the request denied, at 1020. So, the method 1000 can choose or switch between executing the operation (e.g., when the at least a first use identifier is consistent with the second use identifier) and denying the operation based on the results of the comparing (e.g., when the at least a first use identifier is not consistent with the second use identifier).

FIG. 10B illustrates an example method 1030 for automatically associating a use restriction associated with source data with derivative data. In particular aspects, the method 1030 can be carried out using the architecture 800 of FIG. 8.

At 1035, data is received that includes a data value and one or more restriction annotations. The one or more restriction annotations include at least one use restriction. A request to create derivative data from the data value is received at 1040. At 1045, a purpose associated with the request is compared with the at least one use restriction. It is determined at 1050 that the purpose is consistent with the at least one use restriction. The derivative data is created at 1055. At 1060, the at least one use restriction is automatically associated with the derivative data. In another example, rather than the purpose being checked when the request to create derivative data is made, the purpose can be checked at an earlier time (such as to confirm that a process is permitted that later creates the derivative data), and the derivative data created without an additional check.

FIG. 10C illustrates an example method 1070 for retrieving data instances associated with a specified data identifier or data subject identifier. In particular aspects, the method 1070 can be carried out using the architecture 800 of FIG. 8.

At 1075, a plurality of data instances are received. The plurality of data instances are associated with at least a first data subject identifier, at least a first data identifier, and at least one use restriction. A request for data instances associated with the first data identifier or the first data subject identifier is received at 1080. At 1085, the plurality of data instances are returned in response to the request, such as to a requesting user or a requesting application (e.g., in response to a user query, such as a query specified in a query language, including a formal query language such as the structure query language (SQL)).

Example 11—Computing Systems

Figure 11:
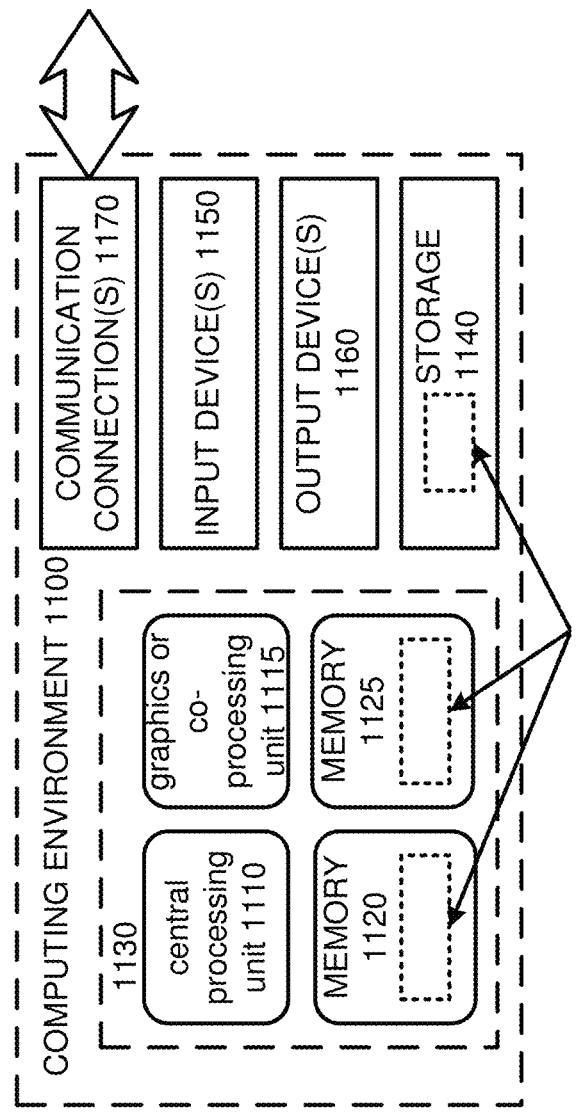
FIG. 11 is a diagram of an example computing system in which some described embodiments can be implemented.

FIG. 11 depicts a generalized example of a suitable computing system 1100 in which the described innovations may be implemented. The computing system 1100 is not intended to suggest any limitation as to scope of use or functionality of the present disclosure, as the innovations may be implemented in diverse general-purpose or special-purpose computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 execute computer-executable instructions, such as for implementing components of the architecture 800 of FIG. 8. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s) 1110, 1115. The memory 1120, 1125 stores software 1180 implementing one or more innovations described herein, in the form of computer-executable instructions suitable for execution by the processing unit(s) 1110, 1115. The memory 1120, 1125, may also store database data, such as data associated with the database 856 of FIG. 8.

A computing system 1100 may have additional features. For example, the computing system 1100 includes storage 1140, one or more input devices 1150, one or more output devices 1160, and one or more communication connections 1170. An interconnection mechanism (not shown) such as a bus, controller, or network interconnects the components of the computing system 1100. Typically, operating system software (not shown) provides an operating environment for other software executing in the computing system 1100, and coordinates activities of the components of the computing system 1100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing system 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing system 1100. The output device(s) 1160 may be a display, printer, speaker, CD-writer, or another device that provides output from the computing system 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 12—Cloud Computing Environment

Figure 12:
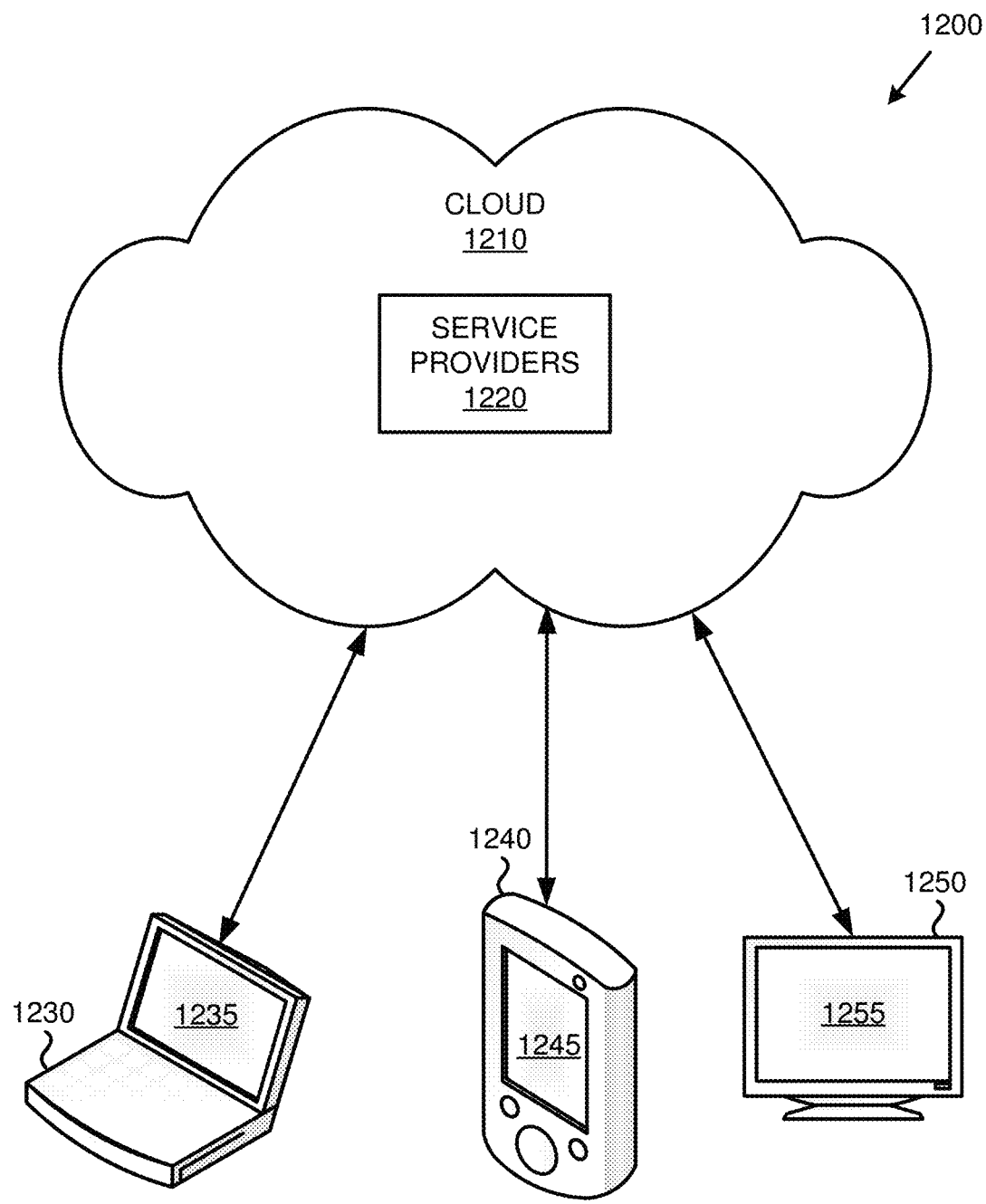
FIG. 12 is an example cloud computing environment that can be used in conjunction with the technologies described herein.

In example environment 1200 of FIG. 12, the cloud 1210 provides services for connected devices 1230, 1240, 1250 with a variety of screen capabilities. Connected device 1230 represents a device with a computer screen 1235 (e.g., a mid-size screen). For example, connected device 1230 could be a personal computer such as desktop computer, laptop, notebook, netbook, or the like. The connected device 1240 represents a device with a mobile device screen 1245 (e.g., a small size screen). For example, the connected device 1240 could be a mobile phone, smart phone, personal digital assistant, tablet computer, and the like. The connected device 1250 represents a device with a large screen 1255. For example, the connected device 1250 could be a television screen (e.g., a smart television) or another device connected to a television (e.g., a set-top box or gaming console) or the like. One or more of the connected devices 1230, 1240, 1250 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1200. For example, the cloud 1210 can provide services for one or more computers (e.g., server computers) without displays.

Services can be provided by the cloud 1210 through service providers 1220, or through other providers of online services (not depicted). For example, cloud services can be customized to the screen size, display capability, and/or touch screen capability of a particular connected device (e.g., connected devices 1230, 1240, 1250).

In example environment 1200, the cloud 1210 provides the technologies and solutions described herein to the various connected devices 1230, 1240, 1250 using, at least in part, the service providers 1220. For example, the service providers 1220 can provide a centralized solution for various cloud-based services. The service providers 1220 can manage service subscriptions for users and/or devices (e.g., for the connected devices 1230, 1240, 1250 and/or their respective users).

Example 13—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 11, computer-readable storage media include memory 1120 and 1125, and storage 1140. The term computer-readable storage media does not include signals and carrier waves. In addition, the term computer-readable storage media does not include communication connections (e.g., 1170).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. One or more computer-readable storage media storing computer-executable instructions for causing a computing system to perform processing to selectively execute an operation request for a data type instance, the processing comprising:

receiving in physical memory a first instance of a data type, the first instance comprising at least a first data member storing at least a first value of the first instance and at least a second data member storing at least a second value associated with restriction metadata for the first instance, the restriction metadata comprising an identifier of a data subject associated with the at least the first value, wherein the at least the first value belongs, or applies, to the data subject, and at least a first use identifier associated with information sufficient to determine one or more prohibited or permitted uses of the at least the first value, the one or more prohibited or permitted uses being selected from a plurality of defined use types;

receiving a request for an operation defined as a method of the data type to transfer the at least the first value of the first instance, to create derivative data using the at least the first value of the first instance, or to output the at least the first value of the first instance, the request associated with at least a second use identifier identifying at least one use or action to be performed using the at least the first value, the second use identifier being selected from the plurality of defined use types;

comparing the at least the second use identifier with at the least the first use identifier associated with the restriction metadata; and executing the operation or denying the request based on results of the comparing.

2. The one or more computer-readable storage media of claim 1, wherein the request for an operation comprises a request to generate derivative data, the processing further comprising:

generating derivative data based at least in part on the at least the first value, the generating comprising copying at least a portion of the restriction metadata of the first instance to restriction metadata of the derived data.

3. The one or more non-transitory computer-readable storage media of claim 2, wherein the derived data is stored in a second instance of the data type.

4. The one or more computer-readable storage media of claim 1, the processing further comprising:

accessing a profile associated with the identifier of the data subject; and determining the at least the first use identifier from the profile.

5. The one or more computer-readable storage media of claim 1, wherein the at least a first use identifier is stored in the restriction metadata.

6. The one or more computer-readable storage media of claim 1, wherein the restriction metadata comprises an indicator of a sensitivity level of the first instance.

7. The one or more computer-readable storage media of claim 6, the processing further comprising:

determining whether the requested operation outputs data comprising the first instance and a value useable to identify the data subject.

8. The one or more computer-readable storage media of claim 1, the processing further comprising:

generating a log entry comprising the requested operation.

9. The one or more computer-readable storage media of claim 1, wherein the restriction metadata comprises an event identifier and the processing further comprises:

determining that an event associated with the event identifier has occurred; and taking a predetermined action based at least in part on determining that the event has occurred.

10. The one or more computer-readable storage media of claim 9, wherein the action comprises deleting the first instance.

11. The one or more computer-readable storage media of claim 1, wherein the processing further comprises:

receiving a request for data associated with the data subject;

searching a database for data having restriction metadata comprising the identifier of the data subject; and returning search results to a user or requesting application.

12. The one or more computer-readable storage media of claim 1, the processing further comprising:

receiving a request to export the first instance; and providing the at least the first value apart from the restriction metadata.

13. The one or more computer-readable storage media of claim 1, wherein the restriction metadata comprises at least one data identifier identifying the restriction metadata as associated with the first instance.

14. The one or more computer-readable storage media of claim 13, wherein the restriction metadata is first restriction metadata, the processing further comprising:

generating derivative data based at least in part on the first instance, the generating comprising copying the data identifier to second restriction metadata associated with the derivative data.

15. The one or more computer-readable storage media of claim 1, the processing further comprising:

receiving a request for data associated with a data identifier;

searching a database for data having the data identifier; and returning the search results to a user or requesting application, the search results comprising data associated with a plurality of data type instances, including the first instance, having the data identifier in restriction metadata for the respective data type instances.

16. The one or more computer-readable storage media of claim 1, the processing further comprising:

receiving request to pseudonymize the first instance; and replacing the identifier of the data subject in the restriction metadata with a value that does not identify the data subject.

17. The one or more computer-readable storage media of claim 1, the processing further comprising:

generating a second instance of the data type, restriction metadata of the second instance comprising an identifier indicating that the second instance is not subject to a data restriction policy.

18. A computing system that implements a compliance tool, the computing system comprising:

one or more memories;

one or more processing units coupled to the one or more memories; and one or more computer readable storage media storing instructions that, when loaded into the memories, cause the one or more processing units to perform operations for:

receiving data comprising a data value and one or more restriction annotations, the one or more restriction annotations associated with at least one use restriction selected from a plurality of defined use types;

instantiating a first instance of a data type, the data type comprising a data value data member and a restriction annotation data member, the instantiating comprising storing the data value in the data value data member and storing at least one value indicating the at least one use restriction, or useable to access the at least one use restriction, in the restriction annotation data member;

receiving a request to create derivative data from the data value stored in the first instance, the request comprising a purpose selected from the plurality of defined use types;

calling a method of the data type specified by the request, the calling comprising:

comparing the purpose associated with the request with the at least one use restriction;

determining that the purpose is consistent with the at least one use restriction;

creating the derivative data; and automatically associating the at least one use restriction with the derivative data.

19. The computing system of claim 18, the operations further comprising:

generating a log entry corresponding to an operation creating the derivative data;

receiving a request to view log entries associated with a data identifier associated with the data and the derivative data; and retrieving the log entry in response to the request.

20. In a computing system comprising a memory and one or more processors, a method of retrieving data instances associated with a specified data identifier or data subject identifier, the method comprising:

receiving a plurality of data instances, each of the data instances associated with at least a first data subject identifier, at least a first data identifier, at least one value, and at least one use restriction specifying one or more permitted or prohibited uses of the at least one value, the at least one use restriction being selected from a plurality of predefined use types;

receiving a request for data instances associated with the first data identifier or the first data subject identifier; and returning the plurality of data instances to a requesting user or application in response to the request.

* * * * *